US008762298B1

(12) United States Patent
Ranjan et al.

(10) Patent No.: US 8,762,298 B1
(45) Date of Patent: Jun. 24, 2014

(54) MACHINE LEARNING BASED BOTNET DETECTION USING REAL-TIME CONNECTIVITY GRAPH BASED TRAFFIC FEATURES

(75) Inventors: Supranamaya Ranjan, Albany, CA (US); Joshua Robinson, San Francisco, CA (US); Feilong Chen, East Lansing, MI (US)

(73) Assignee: Narus, Inc., Sunnyvale, CA (US)

( * ) Notice: Subject to any disclaimer, the term of this patent is extended or adjusted under 35 U.S.C. 154(b) by 514 days.

(21) Appl. No.: 12/985,263

(22) Filed: Jan. 5, 2011

(51) Int. Cl.
*G06N 5/02* (2006.01)
*G06N 99/00* (2010.01)
*H04L 1/00* (2006.01)
*H04L 29/06* (2006.01)

(52) U.S. Cl.
CPC ............... *G06N 5/02* (2013.01); *G06N 99/005* (2013.01); *H04L 63/14* (2013.01)
USPC .......................................................... 706/12

(58) Field of Classification Search
CPC ........ G06N 5/02; G06N 99/005; H04L 63/14; H04L 63/1408; H04L 63/1416; H04L 63/1425
See application file for complete search history.

(56) References Cited

U.S. PATENT DOCUMENTS

| | | | |
|---|---|---|---|
| 2010/0095374 A1* | 4/2010 | Gillum et al. | 726/22 |
| 2010/0138919 A1* | 6/2010 | Peng et al. | 726/22 |
| 2010/0161537 A1* | 6/2010 | Liu et al. | 706/46 |
| 2010/0162350 A1* | 6/2010 | Jeong et al. | 726/1 |
| 2011/0153811 A1* | 6/2011 | Jeong et al. | 709/224 |
| 2011/0179492 A1* | 7/2011 | Markopoulou et al. | 726/25 |

OTHER PUBLICATIONS

Masud et al, Flow-based Identification of Botnet Traffic by Mining Multiple Log Files, 2008.*
Wang et al, Centralized Botnet Detection by Traffic Aggregation, 2009.*
Kim et al, BotXrayer: Exposing Botnets by Visualizing DNS Traffic, 2009.*
Nagaraja et al, BotGrep: Finding P2P Bots with Structured Graph Analysis, 2010.*
Mukkamala, Srinivas, et al., "Feature Selection for Intrusion Detection using Neural Networks and Support Vector Machines", Proceedings of IEEE International Joint Conference on Neural Networks, pp. 1702-1707, 2002.

(Continued)

*Primary Examiner* — Alan Chen
*Assistant Examiner* — Mikayla Chubb
(74) *Attorney, Agent, or Firm* — Fernandez & Associates, LLP

(57) ABSTRACT

A method for identifying a botnet in a network, including analyzing historical network data using a pre-determined heuristic to determine values of a connectivity graph based feature in the historical network data, obtaining a ground truth data set having labels assigned to data units in the historical network data identifying known malicious nodes in the network, analyzing the historical network data and the ground truth data set using a machine learning algorithm to generate a model representing the labels as a function of the values of the connectivity graph based feature, analyzing real-time network data using the pre-determined heuristic to determine a value of the connectivity graph based feature for a data unit in the real-time network data, assigning a label to the data unit by applying the model to the value of the connectivity graph based feature, and categorizing the data unit as associated with the botnet based on the label.

15 Claims, 8 Drawing Sheets

(56) References Cited

OTHER PUBLICATIONS

Kohavi, Ron, "Scaling Up the Accuracy of Naive-Bayes Classifiers: a Decision Tree Hybrid", Proceedings of the Second International conference on Knowledge and Data Mining (KDD-96), Aug. 2-4, 1996, Portland, Oregon.

Moheeb Abu Rajab "A Multifaceted Approach to Understanding the Botnet Phenomenon", Proceedings of ACM SIGCOMM/USENIX Internet Measurement Conference (IMC), Oct. 25-27, 2006, Rio de Janeiro, Brazi.

Xu, Kuai, et al., "Profiling Internet BackboneTraffic: Behavior Models and Applications", Sprint ATL Research Report, Proceedings of ACM SIGCOMM 2005 conference on Applications, technologies, architectures, and protocols for computer communications, Aug. 22-26, Philadelphia, PA, published by ACM, NY, NY, 2005.

Perdisci, Roberto, et al. "Behavioral Clustering of HTTP-Based Malware and Signature Generation Using Malicious Network Traces", USENIX Symposium on Networked Systems Design and Implementation, NDSI 2010.

Choi, Hyunsang, et al., "Botnet Detection by Monitoring Group Activities in DNS Traffic", 7th IEEE International Conference on Computer and Information Technology, CIT 2007, Oct. 16-19, 2007, pp. 715-720, Aizu-Wakamatsu, Fukushima.

Freund, Yoav et al., "The alternating decision tree learning algorithm", Machine Learning: Proceedings of the Sixteenth International Conference, Jun. 27-30, 1999, pp. 124-133.

Krishnan. V., et al., "Web spam detection with anti-trust rank", Proceedings of 2nd International Workshop on Adversarial Information Retrieval on the Web, AIRWeb 2006, Aug. 10, 2006, Seattle, pp. 37-40.

Gu, G, et al., "BotHunter: Detecting Malware Infection Through IDS-Driven Dialog Correlation," Proceedings of 16th USENIX Security Symposium (Security '07), Aug. 2007. pp. 1-16, Aug. 6-10, 2007, Boston, MA.

John, P.J., et al. "Studying Spamming Botnets Using Botlab", Proceedings of the 6th USENIX symposium on Networked systems design and implementation, Apr. 22-24, 2009, pp. 291-306, Boston, MA.

Porras, Phillip, et al., "A Foray into Conficker's Logic and Rendezvous Points", Proceedings of LEET'09 Proceedings of the 2nd USENIX conference on Large-scale exploits and emergent threats: botnets, spyware, worms, and more, 2009, USENIX Association Berkeley, CA.

Faloutsos, Michalis, et al., "On Power-Law Relationships of the Internet Topology", in Proceedings of ACM SIGCOMM Applications, Technologies, Architectures, and Protocols for Computer Communication, Sep. 1999, pp. 251-262, Harvard University Science Center, Cambridge, MA.

Ramachandran, Anirudh, et al., "Revealing Botnet Membership Using DNSBL Counter-Intelligence", SRUTI'06 Proceedings of the 2nd conference on Steps to Reducing Unwanted Traffic on the Internet, vol. 2, 2006, USENIX Association, Berkeley, CA.

Seo, Jungtaek, et al. "Clustering-based Feature Selection for Internet Attack Defense", in International Journal of Future Generation Communication and Networking, vol. 1, No. 1, pp. 91-98.

Binkley, James, R., et al. "An Algorithm for Anomaly-based Botnet Detection", Proceedings of SRUTI '06, 2nd Workshop on Steps to Reducing Unwanted Traffic on the Internet, pp. 43-48, Jul. 7, 2006, San Jose, CA.

\* cited by examiner

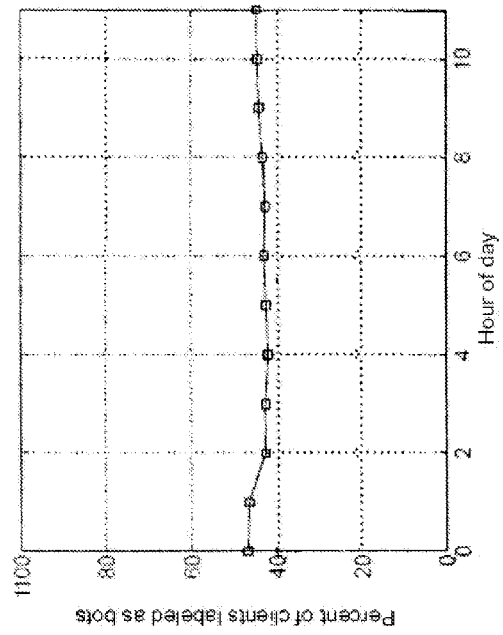
FIG. 4A Number of clients
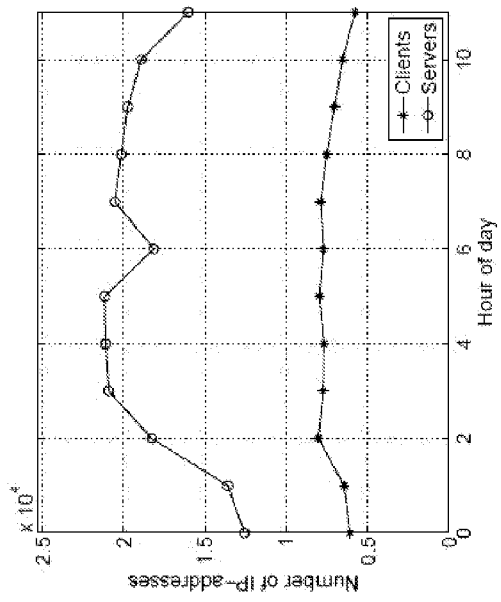
FIG. 4B Fraction of bots
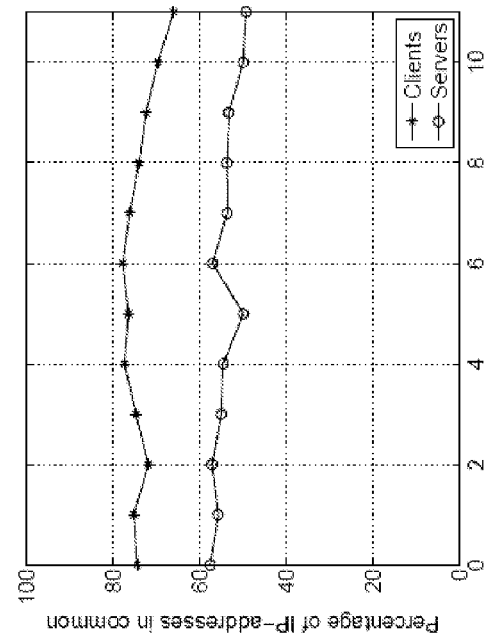
FIG. 4C IP-addresses in common

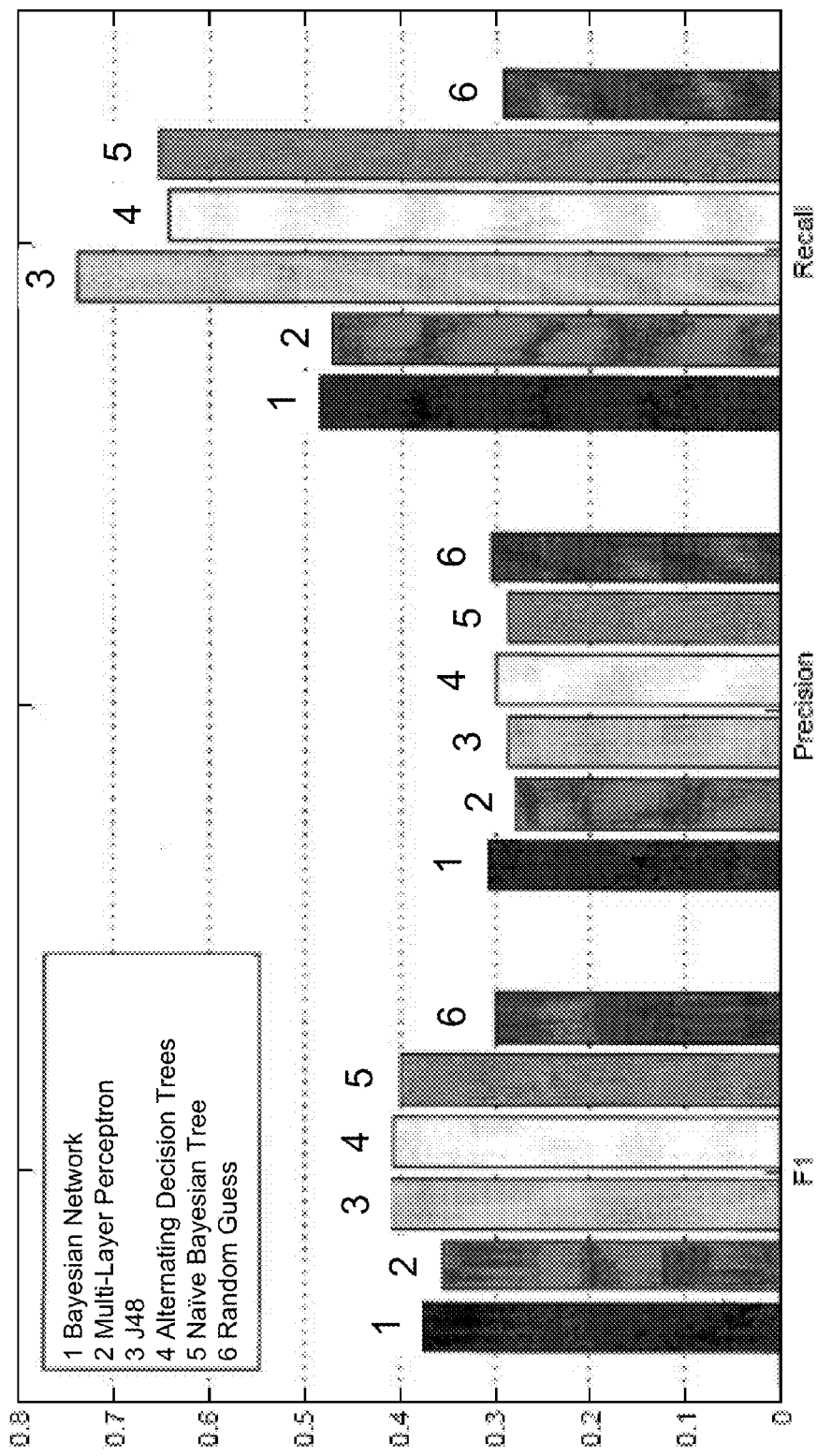
FIG. 4D Results for detecting Bot IP-addresses.

MACHINE LEARNING BASED BOTNET DETECTION USING REAL-TIME CONNECTIVITY GRAPH BASED TRAFFIC FEATURES

CROSS REFERENCE TO RELATED APPLICATIONS

This application is related to co-pending U.S. patent application Ser. No. 12/978,378, filed on Dec. 23, 2010, and entitled "MACHINE LEARNING BASED BOTNET DETECTION USING REAL-TIME EXTRACTED TRAFFIC FEATURES," also assigned to the assignee of the present application and incorporated herein by reference.

BACKGROUND OF THE INVENTION

1. Field of the Invention

The present invention relates to computers and computer networks. More particularly, the invention relates to detecting malicious activities in the computer network.

2. Background of the Related Art

The term "botnet" refers to a collection of malicious software agents (referred to as robots) that run autonomously and automatically. The term "botnet" can also be used to refer to a collection of compromised computers (referred to as bots) each infected with one or more of such malicious software agents. For example, the infection may be a result of installation via drive-by downloads exploiting web browser vulnerabilities, worms, Trojan horses, or backdoors, under a common command-and-control infrastructure. Typically, the owner (i.e., originator, operator, or controller) of a botnet uses the botnet to coordinate spam campaigns, launch denial-of-service attacks, or steal sensitive information. Several botnets have been found and removed from the Internet. The Dutch police found a 1.5 million node botnet and the Norwegian ISP (Internet service provider) Telenor disbanded a 10,000-node botnet. Large coordinated international efforts to shut down botnets have also been initiated. It has been estimated that up to one quarter of all personal computers connected to the internet may be part of a botnet.

A botnet's originator can control the bots remotely, usually through a means such as IRC (Internet Relay Chat), from a command-and-control (C&C) server. Though rare, more experienced botnet operators program their own commanding protocols from scratch. For example, these protocols may include a server program for C&C and a client program for operation that embeds itself on the victim's machine (i.e., bot). Both programs usually communicate with each other over a network using a unique encryption scheme for stealth and protection against detection or intrusion into the botnet network.

Generally, detection of C&C channels is difficult for many reasons, including: 1) the use of HTTP protocols to bypass firewalls, 2) encryption to obscure payloads, and 3) "domain fast-flux," i.e., constantly changing locations of command-and-control servers. Existing approaches that look for payload signatures can be easily defeated by encryption or obfuscation techniques. Techniques that identify periodic, beaconing traffic have difficulty in real traffic traces due to very high background noise levels and random timing perturbations introduced by new botnets. There are also practical limitations to collecting detailed flow data at high speed routers which can introduce unacceptable overhead on the network.

SUMMARY

In general, in one aspect, the invention relates to a method for identifying a botnet in a network. The method includes obtaining historical network data in the network, the historical network data comprising a first plurality of data units, analyzing, by a central processing unit (CPU) of a computer and using a pre-determined heuristic, the historical network data to determine a plurality of values of a connectivity graph based feature for the first plurality of data units, wherein a first value of the connectivity graph based feature for a first data unit of the first plurality of data units is determined based on at least a portion of the historical network data associated with the first data unit, obtaining a ground truth data set associated with the historical network data, the ground truth data set comprising a plurality of labels with each label assigned to a corresponding data unit of the first plurality of data units, said each label comprising one of a first label categorizing said corresponding data unit as associated with the botnet and a second label categorizing said corresponding data unit as being not associated with the botnet, analyzing, by the CPU and using a machine learning algorithm, the historical network data and the ground truth data set to generate a model representing the plurality of labels as a function of the plurality of values of the connectivity graph based feature, obtaining real-time network data in the network, the real-time network data comprising a second plurality of data units, analyzing, by the CPU and using the pre-determined heuristic, the real-time network data to determine a second value of the connectivity graph based feature for a second data unit of the second plurality of data units, wherein the second value is determined based on at least a portion of the real-time network data associated with the second data unit, assigning a third label to the second data unit by applying the model to the second value of the connectivity graph based feature, and categorizing the second data unit as associated with the botnet based on the third label.

In general, in one aspect, the invention relates to a system for identifying a botnet in a network. The system includes a processor and memory storing instructions. The instruction, when executed by the processor, include functionalities for obtaining historical network data in the network, the historical network data comprising a first plurality of data units, analyzing, using a pre-determined heuristic, the historical network data to determine a plurality of values of a connectivity graph based feature for the first plurality of data units, wherein a first value of the connectivity graph based feature for a first data unit of the first plurality of data units is determined based on at least a portion of the historical network data associated with the first data unit, obtaining a ground truth data set associated with the historical network data, the ground truth data set comprising a plurality of labels with each label assigned to a corresponding data unit of the first plurality of data units, said each label comprising one of a first label categorizing said corresponding data unit as associated with the botnet and a second label categorizing said corresponding data unit as being not associated with the botnet, analyzing, using a machine learning algorithm, the historical network data and the ground truth data set to generate a model representing the plurality of labels as a function of the plurality of values of the connectivity graph based feature, obtaining real-time network data in the network, the real-time network data comprising a second plurality of data units, analyzing, using the pre-determined heuristic, the real-time network data to determine a second value of the connectivity graph based feature for a second data unit of the second plurality of data units, wherein the second value is determined based on at least a portion of the real-time network data associated with the second data unit, assigning a third label to the second data unit by applying the model to the second value of the connectivity graph based feature, and categorizing the second data unit as associated with the botnet based on the third label.

In general, in one aspect, the invention relates to a non-transitory computer readable medium storing instructions for identifying a botnet in a network. The instructions when executed by a processor of a computer includes functionality for obtaining historical network data in the network, the historical network data comprising a first plurality of data units, analyzing, using a pre-determined heuristic, the historical network data to determine a plurality of values of a connectivity graph based feature for the first plurality of data units, wherein a first value of the connectivity graph based feature for a first data unit of the first plurality of data units is determined based on at least a portion of the historical network data associated with the first data unit, obtaining a ground truth data set associated with the historical network data, the ground truth data set comprising a plurality of labels with each label assigned to a corresponding data unit of the first plurality of data units, said each label comprising one of a first label categorizing said corresponding data unit as associated with the botnet and a second label categorizing said corresponding data unit as being not associated with the botnet, analyzing, using a machine learning algorithm, the historical network data and the ground truth data set to generate a model representing the plurality of labels as a function of the plurality of values of the connectivity graph based feature, obtaining real-time network data in the network, the real-time network data comprising a second plurality of data units, analyzing, using the pre-determined heuristic, the real-time network data to determine a second value of the connectivity graph based feature for a second data unit of the second plurality of data units, wherein the second value is determined based on at least a portion of the real-time network data associated with the second data unit, assigning a third label to the second data unit by applying the model to the second value of the connectivity graph based feature, and categorizing the second data unit as associated with the botnet based on the third label.

Other aspects and advantages of the invention will be apparent from the following description and the appended claims.

BRIEF DESCRIPTION OF DRAWINGS

FIGS. 3A-4D show an example according to aspects of the invention.

DETAILED DESCRIPTION

Figure 1:
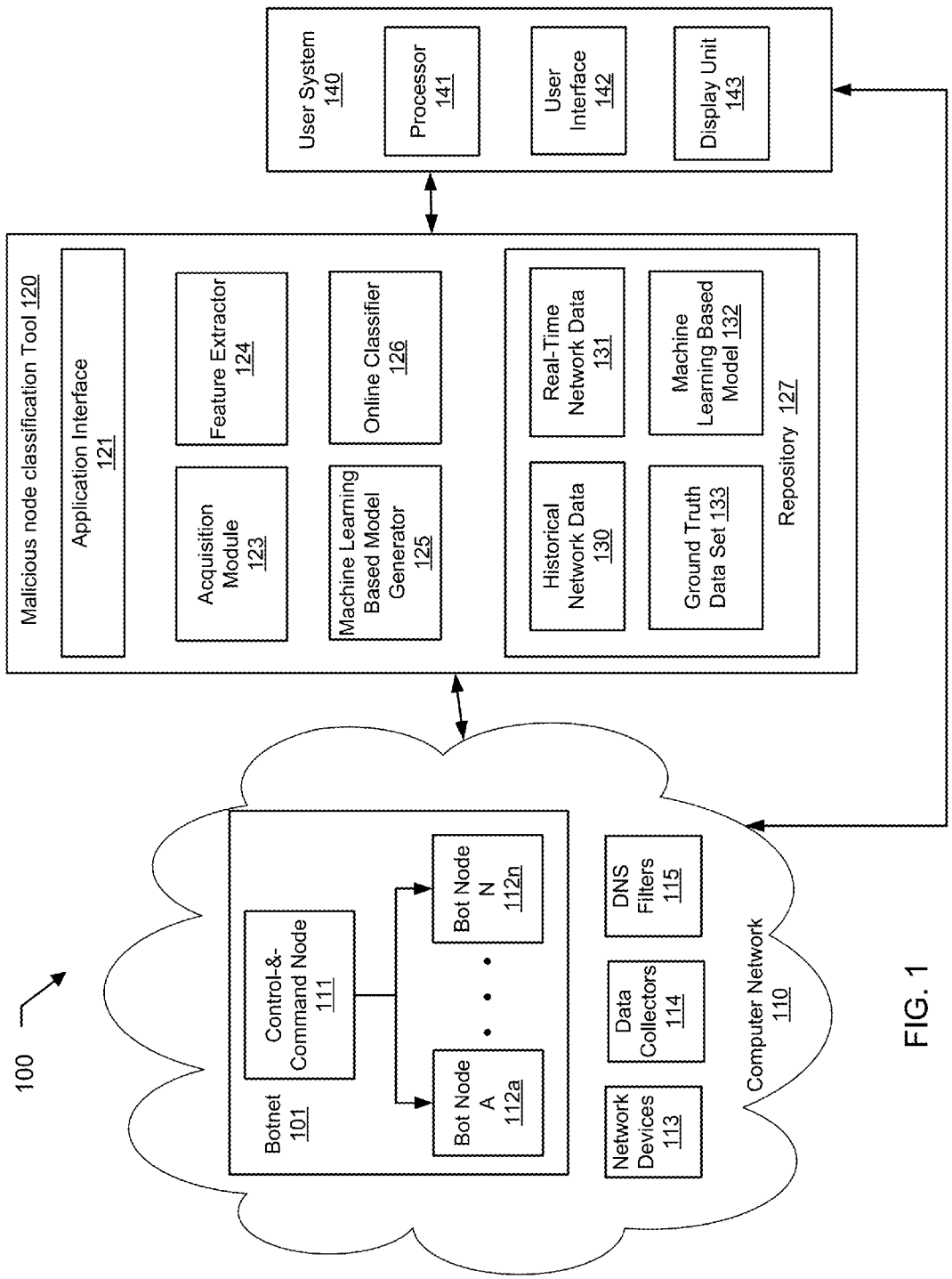
FIG. 1 shows a system block diagram according to aspects of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

Embodiments of the invention address the problem of detecting bots in network traffic based on a classification model learned using machine learning algorithms based on features extracted from historical network data and applying the learned classification model to features extracted in real-time from current network data. In one or more embodiments, the features may be derived by using just the layer-3 communication graph of "who talks to whom". In particular, the layer-3 communication graph presents a worst-case scenario for bot detection, i.e., the least amount of information available to a classifier or detector: source and destination IP addresses and timestamp of communication. Specifically, packet size or number of packets in a flow may not be used. While this makes the botnet detection problem significantly harder, such approach delivers higher performance in botnet detection. Throughout this disclosure, the terms "feature" and "connectivity graph based feature" may be used interchangeably except otherwise specified (e.g., layer-4 feature).

In one or more embodiments, IP-IP connectivity graph is constructed during a learning phase and used in a supervised machine learning process to distinguish bots from legitimate machines. The IP-IP connectivity graph is constructed over a period of time by counting the number of flows exchanged between an IP-pair over the time period. From this graph, the following example metrics for each IP node are extracted: (1) outdegree that counts the number of hosts contacted by the IP node, with bots expected to have higher values especially in the presence of IP fast fluxing when a bot would be expected to contact several C&C servers over a time period to obtain commands, (2) indegree that counts the number of hosts by which the IP node is contacted, with C&C servers expected to have higher values, (3) PageRank of a IP node that indicates the degree of connectedness of the node, with bots expected to have higher values, (4) a statistical measure "bot-neighborhood" that measures the number of previously known bots or C&C servers reachable from each IP node within a certain number of hops, with higher values more likely to indicate bots, and (5) anti-trust rank which combines the metrics of PageRank and bot-neighborhood, by computing the Page Rank of a node in the IP-IP connectivity graph, where each edge related to a previously known bot or C&C server is given higher weight than an edge related to known good IP addresses. In this regards, anit-trust rank will give lower values to good nodes and higher values to bad nodes, since bad nodes will be reachable from many other bad nodes.

In one or more embodiments, additional features may be derived by leveraging layer-4 features that provide more details about the connection between a pair of IP addresses. In particular, additional accuracy can be obtained by utilizing layer-4 communication patterns on top of the graph-theoretic layer-3 features described above. In an example embodiment, 29 layer-4 traffic features are used, such as bytes per second, packets per flow, inter-arrival times, etc. In one or more embodiments, supervised models based on Elastic-Net regularized Logistic Regression and Logistic Model Trees are used to identify which features are more discriminative than others and how much of classification accuracy can be gained by incorporating non-linearity in feature space.

Generally, an intrusion prevention system (IPS) or intrusion detection system (IDS) of a network may be based signature-based detection while a honeypot is a trap set to detect, deflect, or in some manner counteract attempts at unauthorized access to the network. Generally it consists of a computer, data, or a network site that appears to be part of the network and contain information or a resource of value to attackers, but is actually isolated and monitored.

In one or more embodiments, the supervised machine learning based method for online detection of bots using streaming layer-3 and layer-4 information includes (i) using external blacklists (e.g., honeypots and IPS/IDS systems) to provide information (i.e., ground truth data set) about currently known bots and C&C servers, (ii) computing the aforementioned features (e.g., any particular feature or combination of multiple features) for both legitimate and malicious nodes during a training phase based on the ground truth data set, (iii) training models using the following machine learning algorithms: Bayesian network, Multi-layer perceptron, Decision tree, Alternating Decision Tree, and Naives Bayes Tree, and (iv) computing the features for new and not yet labeled IP addresses during an online phase (i.e., real-time detection phase) and applying the trained model to determine whether activities associated with these IP addresses reflect botnet communication or legitimate activity. Accordingly, an IP address may be dynamically labeled as malicious (i.e., associated with a botnet as a bot or C&C server) or legitimate/non-malicious (i.e., not associated with a botnet) as it is observed for the first time in real-time network traffic data or as additional traffic data involving it is observed. For example, if a newly observed IP address begins contacting several other IP addresses over the next couple of hours, it may be classified as a bot at the time when the C&C communication occurs and the features consequently reflect suspicious patterns.

For example, web traffic data collected at the Security Operation Center (SoC) of a Tier-1 ISP may be analyzed using the method described above. This SoC was designed such that a copy of all traffic on commonly occurring HTTP ports (80, 8000, 8080, 443) is forwarded from the routers via port-mirroring to the SoC. In other examples, network traffic data associated with other types of traffic in addition to HTTP traffic may also be analyzed using the method described above.

Given the dynamic nature of botnets, embodiments of the invention re-learn new machine learning models over time, utilizing continually updated lists of known bots for training. In this regards, the classifier is retrained and the learned model is to keep pace with the changing botnet behavior.

FIG. 1 shows a diagram of a system (100) for machine learning based botnet detection using real-time extracted features in accordance with one or more embodiments. The system (100) includes a malicious node classification tool (120), a user system (140), and a computer network (110). The malicious node classification tool (120) includes storage repository (127), one or more application interfaces (121), acquisition module (123), feature extractor (124), machine learning based model generator (125), and online classifier (126). The user system (140) includes a processor (141), a user interface (142), and a display unit (143). The computer network (110) may include wired and/or wireless portions of the Internet and/or other data communications networks such as wide area networks (WANs), local area networks (LANs), etc. Further, a portion of the computer network (110) may be infected by malicious programs to form a botnet (101) including a control-and-command (C&C) node (111) and one or more bot nodes (e.g., bot node A (112a), bot node N (112n), etc.). Generally, the botnet (101) may cause additional malicious activities to affect and/or infect other network devices (e.g., network devices (113)) within the computer network (110). In one or more embodiments, certain device(s) (e.g., data collectors (114)) within the computer network (110) may be configured to collect network data (not shown) for providing to the malicious node classification tool (120). In one or more embodiments, certain device(s) (e.g., DNS filters (115)) within the computer network (110) may be configured to sanction (e.g., passing or blocking) network traffic (e.g., DNS queries, not shown) based on information from the malicious node classification tool (120). The C&C node (111), bot node A (112a), bot node N (112n), and network devices (113) are generally referred to as nodes of the computer network (110). Each of these components is described below. One of ordinary skill in the art will appreciate that embodiments are not limited to the configuration shown in FIG. 1.

In one or more embodiments of the invention, the malicious node classification tool (120) is configured to interact with the computer network (110) using one or more of the application interface(s) (121). The application interface (121) may be configured to receive data (e.g., network traffic data, not shown) from the computer network (110) and/or store received data to the storage repository (127). Such network data captured over a time period (e.g., an hour, a day, a week, etc.) is referred to as trace or network trace. Network trace contains data units (e.g., IP addresses, flows, domain names, etc.) related to communications between nodes in the computer network (110). Further, the network trace may be associated with only time period in the past and is referred to as historical network data. Alternatively, the network trace may be updated continuously from a starting time point and is referred to as real-time network data. For example, the real-time network data may have a fixed static starting time point or may encompass a fixed time interval with a dynamically changing starting time point. For example, the network trace may be captured on a routine basis using the data collectors (114) and selectively sent to the application interface (121) from time to time to be formatted and stored in the repository (127) for analysis. For example, the data collectors (114) may be a packet analyzer, network analyze, protocol analyzer, sniffer, netflow device, semantic traffic analyzer (STA), or other types of data collection device that intercept and log data traffic passing over the computer network (110) or a portion thereof. In one or more embodiments, the data collectors (114) may be deployed in the computer network (110) by a network communication service provider (e.g., ISP), a network security service provider, or other business or government entities. The data collector (114) may be configured to capture and provide network trace to the application interface (121) through an automated process, such as through a direct feed or some other form of automated process. Such network data may be captured and provided on a periodic basis (e.g., hourly, daily, weekly, etc.) or based on a trigger. For example, the trigger may be activated automatically in response to an event in the computer network (110) or activated manually through the user system (140). In one or more embodiments, the data collectors (114) are configured and/or activated by the malicious node classification tool (120).

In one or more embodiments, the application interface (121) may be configured to provide data (e.g., alert or other results) and/or instruction (e.g., to initiate a network security operation) from the malicious node classification tool (120) to the computer network (110). For example, an alert identifying detected malicious node names or an instruction to block malicious traffic may be provided via the application interface (121) to the DNS filters (115). For example, the DNS filters (115) may include a DNS server configured to block certain domain names by specifying the blocked domain names in the DNS server policy, i.e., domain blacklisting. Further, the DNS filters (115) may include a network router that intercept and selectively block DNS traffic (e.g., DNS queries and/or replies) passing over the computer network (110) or a portion thereof. In particular, the identified malicious node name may be used to facilitate the identification of a source node in the computer network (110) that sends one or more DNS queries of such malicious domain names. For example, once a malicious domain name is determined, the DNS flows/packets may be reviewed to determine which client in the network initiated the relevant DNS query: (1) the querier may be a DNS resolver acting on behalf of the actual client (i.e., source node) or (2) it may be the actual client (i.e., source node) which sent the query directly to the DNS server. In case (1) above, the logs maintained at the particular DNS resolver may be reviewed to find out the IP address of the client (i.e., source node) which actually contacted this resolver and be identified as a bot.

Accordingly, one or more network router(s) located logically between the DNS server and the source node (e.g., a bot) sending the malicious DNS queries may be configured to act as the DNS filters (115) blocking such bot-generated DNS queries. In one or more embodiments, the DNS filters (115) may be configured in the computer network (110) by a network communication service provider (e.g., ISP), a network security service provider, or other business or government entities. In one or more embodiments, the malicious node classification tool (120) is configured to support various data formats provided by the computer network (110).

In one or more embodiments, the user system (140) is configured to interact with a user using the user interface (142). The user interface (142) may be configured to receive data and/or instruction(s) from the user. The user interface (142) may also be configured to deliver information (e.g., a report or an alert) to the user. In addition, the user interface (142) may be configured to send data and/or instruction(s) to, and receive data and/or information from, the malicious node classification tool (120). The user may include, but is not limited to, an individual, a group, an organization, or some other entity having authority and/or responsibility to access the malicious node classification tool (120). Specifically, the context of the term "user" here is distinct from that of a user of the computer network (110). The user system (140) may be, or may contain a form of, an internet-based communication device that is capable of communicating with the application interface (121) of the malicious node classification tool (120). Alternatively, the malicious node classification tool (120) may be part of the user system (140). The user system (140) may correspond to, but is not limited to, a workstation, a desktop computer, a laptop computer, or other user computing device.

In one or more embodiments, the processor (i.e., central processing unit (CPU)) (141) of the user system (140) is configured to execute instructions to operate the components of the user system (140) (e.g., the user interface (142) and the display unit (143)).

In one or more embodiments, the user system (140) may include a display unit (143). The display unit (143) may be a two dimensional (2D) or a three dimensional (3D) display configured to display information regarding the computer network (e.g., browsing the network traffic data) or to display intermediate and/or final results of the malicious node classification tool (120) (e.g., report, alert, etc.).

As shown, communication links are provided between the malicious node classification tool (120), the computer network (110), and the user system (140). A variety of links may be provided to facilitate the flow of data through the system (100). For example, the communication links may provide for continuous, intermittent, one-way, two-way, and/or selective communication throughout the system (100). The communication links may be of any type, including but not limited to wired and wireless. In one or more embodiments, the malicious node classification tool (120), the user system (140), and the communication links may be part of the computer network (110).

In one or more embodiments, a central processing unit (CPU, not shown) of the malicious node classification tool (120) is configured to execute instructions to operate the components of the malicious node classification tool (120) (e.g., storage repository (127), the application interface (121), the acquisition module (123), and the online classifier (126)). In one or more embodiments, the memory (not shown) of the malicious node classification tool (120) is configured to store software instructions for analyzing the network trace to extract features, generating classification models, and classifying data units (e.g., IP addresses, flows, domain names, etc.) in the network trace as malicious or legitimate. The memory may be one of a variety of memory devices, including but not limited to random access memory (RAM), read-only memory (ROM), cache memory, and flash memory. The memory may be further configured to serve as back-up storage for information stored in the storage repository (127).

In one or more embodiments, the malicious node classification tool (120) is configured to obtain and store data in the storage repository (127). In one or more embodiments, the storage repository (127) is a persistent storage device (or set of devices) and is configured to receive data from the computer network (110) using the application interface (121). The storage repository (127) is also configured to deliver working data to, and receive working data from, the acquisition module (123), feature extractor (124), machine learning based model generator (125), and online classifier (126). The storage repository (127) may be a data store (e.g., a database, a file system, one or more data structures configured in a memory, some other medium for storing data, or any suitable combination thereof), which may include information (e.g., historical network data (130), real-time network data (131), ground truth data set (133), machine learning based model (132), etc.) related to the malicious node classification. The storage repository (127) may be a device internal to the malicious node classification tool (120). Alternatively, the storage repository (127) may be an external storage device operatively connected to the malicious node classification tool (120).

In one or more embodiments, the malicious node classification tool (120) is configured to interact with the user system (140) using the application interface (121). The application interface (121) may be configured to receive data and/or instruction(s) from the user system (140). The application interface (121) may also be configured to deliver information and/or instruction(s) to the user system (140). In one or more embodiments, the malicious node classification tool (120) is configured to support various data formats provided by the user system (140).

In one or more embodiments, the malicious node classification tool (120) includes the acquisition module (123) that is configured to obtain network trace from the computer network (110), for example via data collectors (114). In one or more embodiments, the acquisition module (123) works in conjunction with the data collectors (114) to parse data packets and collate data packets belonging to the same flow (e.g., defined by a source IP address and a destination IP address). For example, such network trace may then be stored in the repository (127) as historical network data (130) and/or real-time network data.

In one or more embodiments, the acquisition module (123) is further configured to obtain external blacklists that provide information regarding what server domains or IP addresses are known to be malicious and/or whitelists that provide information regarding what server domains or IP addresses are known to be non-malicious. For example, such blacklists and whitelists may include publically available lists or confidential lists of known bots and known non-malicious nodes, respectively, and may be stored in the repository (127) as part of the ground truth data set (133). For example, the ground truth data set (133) may be based on an IP blacklist and a IP whitelist where data units in the ground truth data set associated with one or more IP address in the IP blacklist are labeled as "malicious" while data units in the ground truth data set associated with one or more IP address in the IP whitelist are labeled as "non-malicious". In another example, an IP blacklist is used as the ground truth data set in which case all data units associated with one or more IP address in the IP blacklist are labeled as "malicious" and the ground truth data set does not include any non-malicious data units.

In one or more embodiments, the malicious node classification tool (120) includes the feature extractor (124) that is configured to analyze, using one or more pre-determined heuristic, a network trace (e.g., the historical network data (130), real-time network data (131), etc.) to determine values of a feature for data units in the network trace. In one or more embodiments, such analysis may be performed for each of layer-3 features such as outdegree, page rank, bot-neighborhood count, etc. based on a connectivity graph derived from the network trace and/or layer-4 features such as number of bytes, bytes per packets, etc. for flows extracted from the network trace.

In one or more embodiments, the malicious node classification tool (120) includes the machine learning based model generator (125) that is configured to analyze, using a machine learning algorithm, the historical network data (130) and the ground truth data set (133) to generate a classification model. In one or more embodiments, the ground truth data set (133) and the historical network data (130) associated with a same time interval may be matched to identify a correspondence between known bots in the ground truth data set (133) and data units (e.g., IP addresses, flows, domain names, etc.) in the historical network data (130). In one or more embodiments, such matching may be performed by the machine learning based model generator (125) to generate a label for a data unit in the historical network data (130) specifying the data unit as either malicious or legitimate (i.e., not malicious). In one or more embodiments, the machine learning based model generator (125) uses one or more machine learning (or supervised learning) algorithm to learn the relationship between the labels and feature values (i.e., extracted by the feature extractor (124)) across data units in the historical network data (130) and thereby generating the classification model to statistically represent the labels of the data units as a function of the values of the feature for the data units.

In one or more embodiments, the malicious node classification tool (120) includes the online classifier (126) that is configured to assign a label to each data unit in the real-time network data (131) by applying the classification model to the feature values (i.e., extracted by the feature extractor (124)) across all data units in the real-time network data (131) and thereby categorizing each data unit as associated with a botnet or not.

More details of extracting features, generating classification models, and classifying data units in the real-time network data are described in reference to FIGS. 2 through 4D below.

The malicious node classification tool (120) may include one or more system computers, which may be implemented as a server or any conventional computing system However, those skilled in the art will appreciate that implementations of various technologies described herein may be practiced in other computer system configurations, including hypertext transfer protocol (HTTP) servers, multiprocessor systems, microprocessor-based or programmable consumer electronics, hand-held devices, network personal computers, minicomputers, mainframe computers, and the like.

While specific components are depicted and/or described for use in the units and/or modules of the malicious node classification tool (120), it will be appreciated that a variety of components with various functions may be used to provide the formatting, processing, utility and coordination functions necessary to modify various working data used by the malicious node classification tool (120). The components may have combined functionalities and may be implemented as software, hardware, firmware, or combinations thereof.

Figure 2:
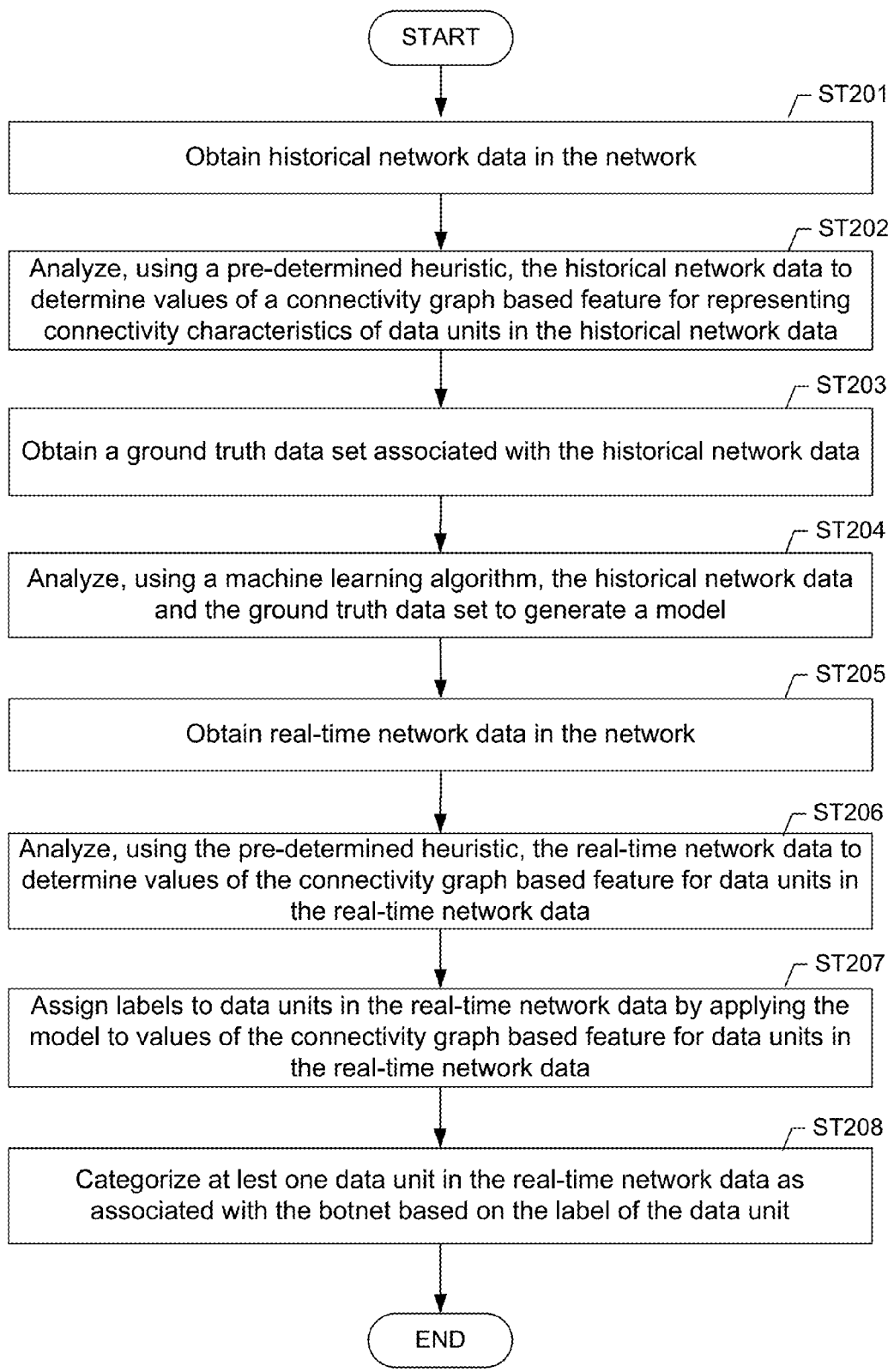
FIG. 2 shows a method flow chart according to aspects of the invention.

FIG. 2 depicts a method flowchart of methods in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2. In one or more embodiments of the invention, the method depicted in FIG. 2 may be practiced using system (100) described with respect to FIG. 1 above.

In one or more embodiments of the invention, a network trace is obtained for analysis from a computer network (e.g., Internet). For example, the network trace may be captured by a packet analyzer, network analyze, protocol analyzer, sniffer, netflow device, semantic traffic analyzer (STA), or other types of data collection device and represents a portion of the network data in the network observable by such data collection device. Further, the network trace may include real-time network data captured in real-time or historical network data previously captured in the computer network. In addition, the real-time network data and/or the historical network data may be a portion of the captured network trace based on a pre-determined sampling criterion to reduce the amount of data processing requirement during analysis.

In one or more embodiments, the real-time network data and/or the historical network data is captured on a periodic basis (e.g., every minute, hourly, daily, etc.) or in response to an event (e.g., observation or elimination of botnet or spam activity). In one or more embodiments, the real-time network data and/or the historical network data is obtained on a periodic basis based on a recurring time window (e.g., every minute, hourly, daily, weekly, monthly, etc.). For example, network data obtained within each of the recurring time windows in the past may be considered as different versions of the historical network data. Throughout this disclosure, the term "recurring time window" may be referred to as "time window" based on context. Further, the most current one of the recurring time windows is referred to as the current time window. In one or more embodiments, the historical network data obtained in the time window immediately prior to the current time window is analyzed to generate a classification model for labeling data units of the real-time network data obtained in the current time window. In one or more embodiments, several versions of the historical network data may be combined based on a statistical averaging scheme to be analyzed to generate the classification model.

In one or more embodiments, the network trace may be updated continuously from a starting time point to be included as real-time network data. For example, the real-time network data may have a fixed static starting time point or may encompass a fixed time interval (e.g., the same as the recurring time window) with a dynamically changing starting time point. In one or more embodiments, the real-time network data includes only network data obtained within the current time window that is analyzed for labeling data units contained therein based on the classification model (e.g., generated from historical network data obtained in the immediately prior time window). In one or more embodiments, the real-time network data includes network data obtained within a pre-determined number (denoted as n) of consecutive time windows including the current time window for performing analysis based on a statistical averaging scheme. In such embodiments, the historical network data may be obtained within the pre-determined number of consecutive time windows immediately prior to the current time window based on the same statistical averaging scheme. Said in other words, the real-time network data may include n−1 number of most recent versions of historical network data while the classification model is generated based on n number of most recent versions of historical network data.

In one or more embodiments, the method of FIG. 2 is configured to generate the classification model using machine learning algorithms based on features extracted from historical network data. Further, the method is configured to label data units (e.g., IP addresses) in the real-time network data by applying the learned classification model to features extracted in real-time from the real-time network data.

As shown in FIG. 2, initially in Step 201, historical network data is obtained in the network. For example, the historical network data includes data units such as IP addresses, flows, domain names, etc. In particular, IP addresses are associated with nodes in the network acting as sources or destinations of the flows where a flow may link a client identified by an IP address and a server of a domain identified by a domain name. In one or more embodiments, data units relate to all flows observed during one or more of the aforementioned recurring time windows immediately prior to the current time window are captured into the historical network data for analysis during the steps below. Accordingly, as the current time window expires into a prior time window in the past, data units relating to all flows observed during the expiring current time window become part of a new version of the historical network data replacing the previous version for analysis during the steps below.

In Step 202, the historical network data is analyzed, using a pre-determined heuristic, to determine values of a feature for the data units in the historical network data. For example, the data units may include IP addresses in which case a value of the feature for a particular IP address may be determined based on a portion of the historical network data associated with the particular IP address. For example, the value of the feature for the particular IP address may be determined based on flows having the particular IP address as the source or destination IP address. In another example, the data units may include client IP addresses as well as server domain names. In such example, a value of the feature for a particular IP address or a particular server domain name may be determined based on a portion of the historical network data associated with the particular IP address or the server domain name, respectively.

In one or more embodiments, the historical network data is analyzed by (1) constructing a graph having nodes representing all IP addresses observed in the historical network data and edges representing communication between pairs of such IP addresses and (2) analyzing the graph to determine the values of the feature corresponding to the IP addresses. Specifically, the feature represents characteristics associated with the nodes and may include outdegree, indegree, page rank, anti-trust rank, bot-neighbor count, etc., or combinations thereof extracted from the graph. In one example, a single feature is used and the feature has a scalar value for each data unit. In another example, multiple types of feature are used and the feature has a vector value for each data unit. In one or more embodiments, the edge is not weighted and represents the existence of any non-zero level of data communications. In one or more embodiments, the edge may be weighted based on a measure of data communications, such as number of packets, flows, connections, etc.

In one or more embodiments, the graph is time dependent and comprises a first graph corresponding to a first version of the historical network data within a first time window and a second graph corresponding to a second version of the historical network data within a second time window. For example, the first time window and the second time window may be consecutive time windows of the aforementioned recurring time windows while the first version and the second version correspond to different versions of the historical network data. Further, the first and second graphs are represented as first and second matrices from which a time averaged matrices may be generated based on a pre-determined statistical formula, such as moving average, auto regressive model, exponentially weighted moving average (EWMA) formula, etc. Accordingly, the values of the feature are determined for the IP addresses based on the time averaged matrix. In one or more embodiments, the EWMA formula includes matrix versions generated from two or more consecutive recurring time windows. More details of the time averaged matrices and the EWMA formula are described in reference to FIG. 3A-4D below.

In one or more embodiments, the historical network data is analyzed by (1) constructing a graph having client nodes representing all client IP addresses observed in the historical network data and server nodes representing all server domain names observed in the historical network data. In addition, the graph includes edges representing communication between pairs of (client IP address, server domain name) and (2) analyzing the graph to determine the values of the feature corresponding to a client IP address or a server domain name. Specifically, the feature represents characteristics associated with the client nodes and/or server nodes and may include outdegree, indegree, page rank, anti-trust rank, bot-neighbor count, etc. extracted from the graph. In one or more embodiments, the edge may be weighted based on a measure of data communications, such as number of packets, flows, connections, etc.

In Step 203, a ground truth data set associated with the historical network data is obtained. In one or more embodiments, the ground truth data set includes labels each assigned to a corresponding data unit in the historical network data. Specifically, each label categorizes the corresponding data unit as malicious (i.e., associated with a botnet) or as legitimate (i.e., not malicious or not associated with a botnet). For example, the ground truth data set may be publically available or confidentially maintained blacklists identifying known botnets, whitelists identifying known non-malicious nodes, or combinations of blacklists and whitelists. In one or more embodiments, the ground truth data set is updated up to the same time window as the historical network data. Said in other words, the ground truth data set reflects the botnet activities during the time window when the historical network data is captured.

In Step 204, the historical network data and the ground truth data set are analyzed for those data units found in both historical network data and the ground truth data set. Specifically, the analysis uses a machine learning algorithm to generate a model that statistically predicts (i.e., models) the labels (denoted as Y) of the data units in the ground truth data set as a function (denoted as f(X)) of the values (denoted as X) of the feature of the corresponding data units calculated using the historical network data. X may have a scalar value if the feature includes only one metric or have a vector value if the feature includes multiple metrics (e.g., one or more of the metrics listed in TABLE 1). For example, data unit $IP_1$ (e.g., a particular IP address) may be found in both the historical network data as well as the ground truth data set. The feature value of $IP_1$ may be calculated as $x.IP_1$ based on characteristics of the historical network data. The label of the data unit $IP_1$ may be "malicious" based on the ground truth data set. The machine learning algorithm is configured to adjust the model such that a prediction of the model based on $f(x.IP_1)$ matches the actual known label of "malicious" for the data unit $IP_1$ in the ground truth data set within a pre-determined statistical accuracy range.

Similarly, data unit $IP_2$ (e.g., another IP address) may be found in both the historical network data as well as the ground truth data set. The feature value of $IP_2$ may be calculated as $x.IP_2$ based on characteristics of the historical network data. The label of the data unit $IP_2$ may be "non-malicious" based on the ground truth data set. The machine learning algorithm is configured to adjust the model such that a prediction of the model based on $f(x.IP_2)$ matches the actual known label of "non-malicious" for the data unit $IP_2$ in the ground truth data set within a pre-determined statistical accuracy range.

In one or more embodiments, the machine learning algorithm may include, but not limited to, Bayesian network, multi-layer perceptron, alternating decision tree, Naive Bayesian tree, or variations thereof.

In Step 205, real-time network data is obtained in the network. In particular, the real-time network data includes same types of data units as those contained in the historical network data, such as IP addresses, flows, domain names, etc. In one or more embodiments, data units relate to all flows observed during the current time window are captured into the real-time network data for feature extraction. Accordingly, as the current time window expires into a prior time window in the past, the real-time network data captured during the expiring current time window becomes a new version of the historical network data and is replaced by a new version of real-time network data to be captured in the upcoming current time window.

In Step 206, the real-time network data is analyzed based on the same pre-determined heuristic used in Step 202 above to determine values of the feature for data units of the real-time network data. As described above, the data units in the real-time network data may include IP addresses and domain names while the feature of each data unit may be extracted from an IP-IP graph or an IP-domain name graph constructed from the real-time network data. In particular, the IP-IP graph or the IP-domain name graph may be the same types of graph described in Step 202. Similarly to the calculation of feature values described in Step 202, a value of the feature for a particular IP address found in the real-time network data may be determined based on a portion of the real-time network data associated with the particular IP address. For example, the value of the feature for the particular IP address may be determined based on flows having the particular IP address as the source or destination IP address. In another example, the data units may include client IP addresses as well as server domain names. In such example, a value of the feature for a particular IP address or a particular server domain name found in the real-time network data may be determined based on a portion of the historical network data associated with the particular IP address or the server domain name, respectively.

Similarly to the calculation of feature values described in Step 202, the feature may be outdegree, indegree, page rank, anti-trust rank, bot-neighbor count, anti trust rank, etc., or combinations thereof extracted from the graph. As noted above, the feature has a scalar value for each data unit if a single feature is used or has a vector value for each data unit if multiple types of feature are used. In one or more embodiments, the real-time network data captured in the current time window may be statistically combined with one or more most recent versions of historical network data for analysis in Step 206.

In Step 207, a label is assigned to a data unit in the real-time network data by applying the model to the value of the feature of the data unit as determined in Step 206 above. Applying the model includes substituting X by the value of the feature determined in Step 206 as input into the aforementioned function f(X) to generate the output as a label assigned to the corresponding data unit. For example, the feature value of data unit $FT_3$ (e.g., a particular IP address) found in the real-time network data may be calculated as $x.FT_3$ based on characteristics of a portion of the real-time network data associated with $FT_3$. The label of the data unit $FT_3$ is then assigned as $f(x.FT_3)$, which is calculated based on the model regardless of whether $FT_3$ is or is not found in either the historical network data or the ground truth data set. For example, the label $f(x.FT_3)$ may be malicious or legitimate. In the case that $f(x.FT_3)$ is malicious, the data unit $FT_3$ is categorized (i.e., classified) as associated with a botnet in Step 208.

Figure 3A:
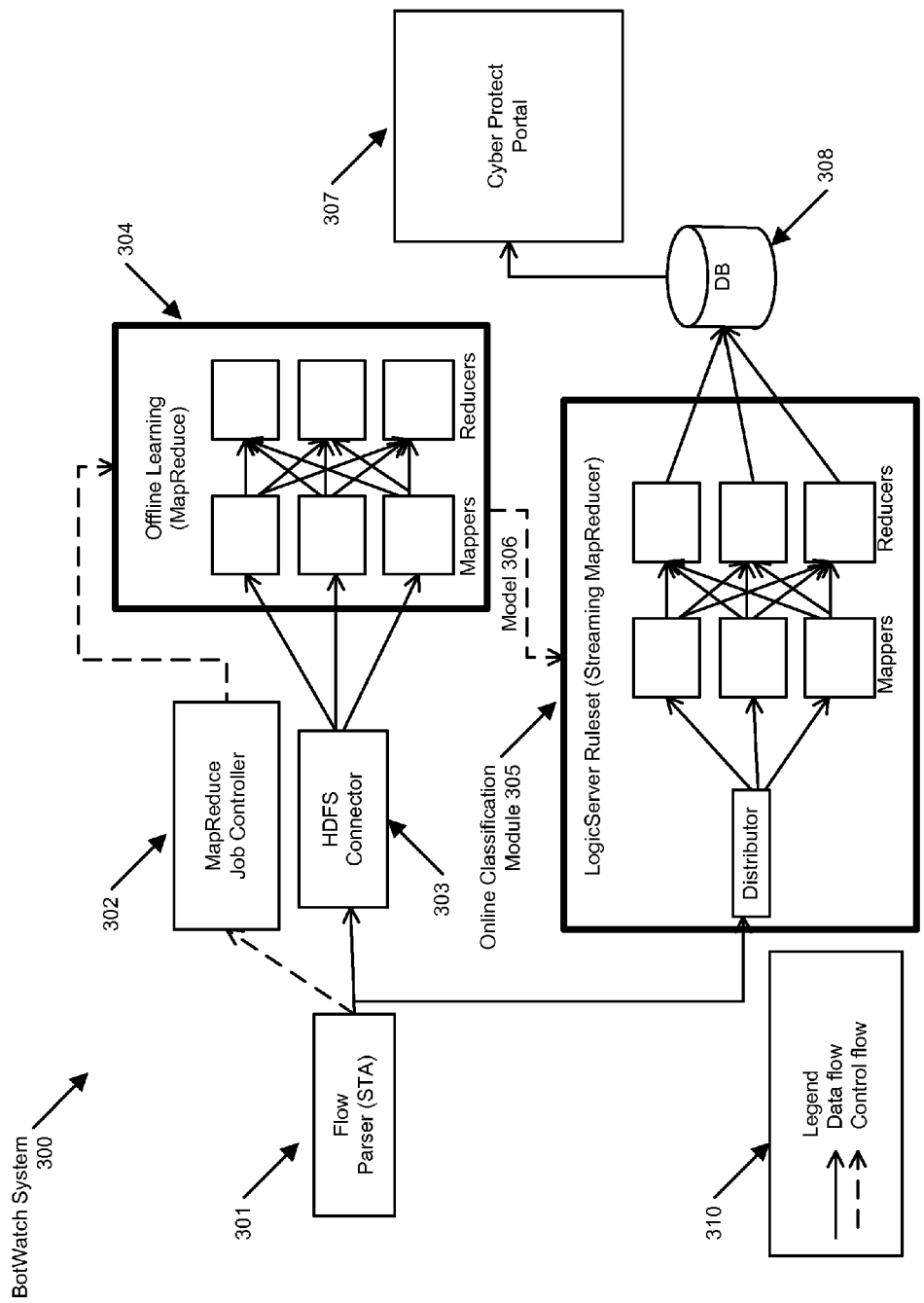
Figure 3B:
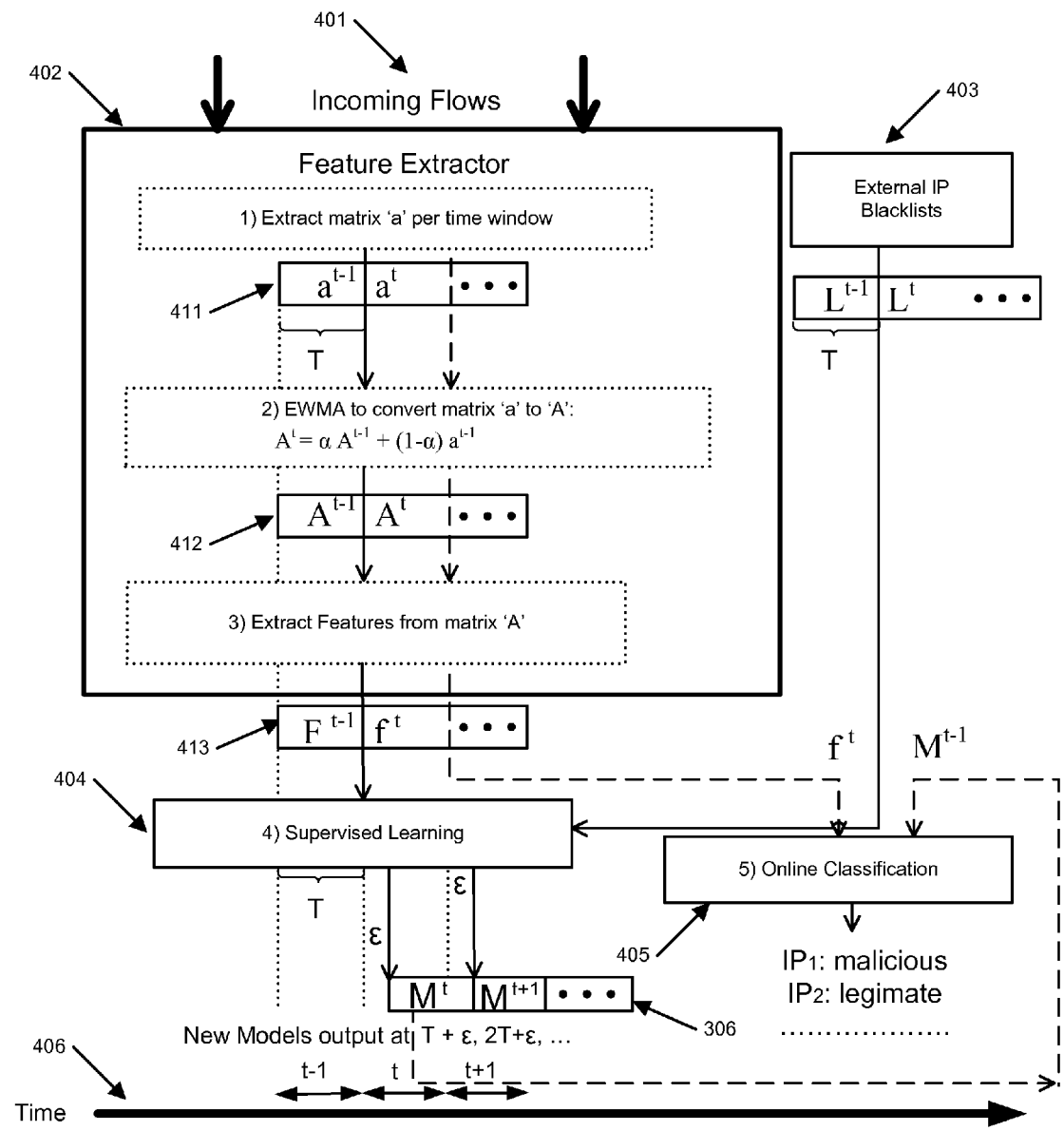

FIGS. 3A and 3B depict an example in accordance with one or more embodiments of the invention. The example is based on the system and method described in FIGS. 1 and 2 above.

FIG. 3A depicts a workflow diagram of the BotWatch system (300) passively monitoring high-rate Internet traffic and continuously analyzing traffic in real-time to detect and label bots with classification results fed to database (308) and accessible by a security professional via a cyber protect portal (307). In the example of FIG. 3, the flow parser (301), offline learning module (304), online classification module (305), and cyber protect portal (307) correspond to acquisition module (123), machine learning based model generator (125), online classifier (126), and user system (140), respectively of FIG. 1. In particular, each of the offline learning module (304) and online classification module (305) includes or has access to feature extraction functionality (shown in more details in FIG. 3B below) provided by the feature extractor (124) of FIG. 1. Further, the classification model (306) is generated by the offline learning module (304) for the online classification module (305) and is essentially the same as the machine learning based model (132) of FIG. 1. In addition, the MapReduce job controller (302) and HDFS (Hadoop Distributed File System) connector (303) facilitate distributed processing performed by the offline learning module (304) and online classification module (305) using clustered computing nodes (e.g., mappers and reducers) forming the MapReduce engines depicted within the offline learning module (304) and online classification module (305). The data flow path of the network traffic data and control flow path of the distributed processing coordination are shown based on the legend (310).

To address new botnets that may appear suddenly, a key element of the BotWatch system (300) is periodic re-training of the classification model (306), such that the system evolves over time to track new botnet threats. The main system work flow path is the online classification path starting from flow parser (301) through online classification module (305) to generate classification results in database (308), with a second path which periodically freezes the network traffic into a set of historical network data for learning an updated classification model. As shown in FIG. 3, the second path starts from flow parser (301) through HDFS connector (303) and offline learning module (304) to generate the classification model (306).

FIG. 3B depicts a data flow diagram of the BotWatch system (300) described above. The inputs to the BotWatch system (300) are layer-3 packets/layer-4 flows (401) in the format of a real-time feed. Such real-time feed may be captured using a netflow device or semantic traffic analyzer (STA), which parses packets and collates packets belonging to the same flow (e.g., defined by a source IP address and a destination IP address). The feature extractor (402) is essentially the same as the feature extractor (124) of FIG. 1 that calculates several graph-based features for each new flow observed in the incoming flows (401). These extracted features are used in the supervised learning (404) to generate classification models (414) and used in the online classification (405) to label the IP addresses as malicious (i.e., associated with a bot) if classified as such based on the classification models (414). During a set time interval T, the BotWatch system uses the current connectivity graph to relearn the classification model M in an offline fashion using the offline learning module (304). Once that model is learned, it is provided to the online portion of the BotWatch system (300) to update the online classification module (305) for performing the online classification (405). External IP address blacklists (403) of known bots provide a collection of known labels as input parameters for heuristics (i.e., algorithms) used in the supervised learning (404).

As shown, the BotWatch system (300) includes a list of IP addresses of known bots and C&C servers in the external IP blacklists (403) that may be (i) an external website that tracks botnets, (ii) output from a IPS/IDS that uses signature-based detection, or (iii) output from a honeypot designed to capture bot behaviors. In one or more embodiments, a label (e.g., malicious or legitimate) may be assigned to each IP address found in the external IP blacklists (403) based on the information contained therein. The IP blacklists (403) is either updated whenever the external source releases a new list, or is queried individually for each new IP address detected in the incoming flows (401). Due to the temporary nature of bots, (e.g., computer users may clean their devices and remove bots) a timestamp is assigned to each entry in the external IP blacklists (403) and stale entries are removed after a predetermined time interval. For example, two versions of a malicious IP lists for two adjacent time intervals (denoted as t−1 and t) each with length T are denoted in FIG. 3B as $L^{t-1}$ and $L^t$. In particular, t−1 represents a time interval previous to the time interval represented by t, which is in turn previous to the time interval represented by t+1 while all three time intervals t−1, t, and t+1 are depicted along the arrow (406) representing flow of time.

The feature extractor (402) maintains graph data structures (e.g., connectivity matrix a (411) and weighted connectivity matrix A (412)) and calculates the features f (413) used in the supervised learning (404) and online classification (405). As noted above, the features f (413) may include outdegree, PageRank, bot neighbor count, etc., or combinations thereof. The key functions of this module are to maintain the weighted connectivity matrix A (412) in a memory-efficient manner and to compute features f (413) via streaming algorithms. The connectivity matrix a (411) and weighted connectivity matrix A (412) are time dependent. For example, two versions of the connectivity matrix a (411) and weighted connectivity matrix A (412) for two adjacent time intervals (denoted as t−1 and t) are maintained/updated in real-time and denoted in FIG. 3B as $a^{t-1}/a^t$ and $A^{t-1}/A^t$, respectively. The feature extractor (402) then uses the current values in A (412) (e.g., $A^{t-1}$ when current time is within the time interval t−1, $A^t$ when current time is within the time interval t, etc.) to calculate the connectivity graph based features f (413) (e.g., $f^{t-1}$, $f^t$, etc.) for each IP address seen in the incoming flows (401) of the monitored traffic.

Figure 3C:
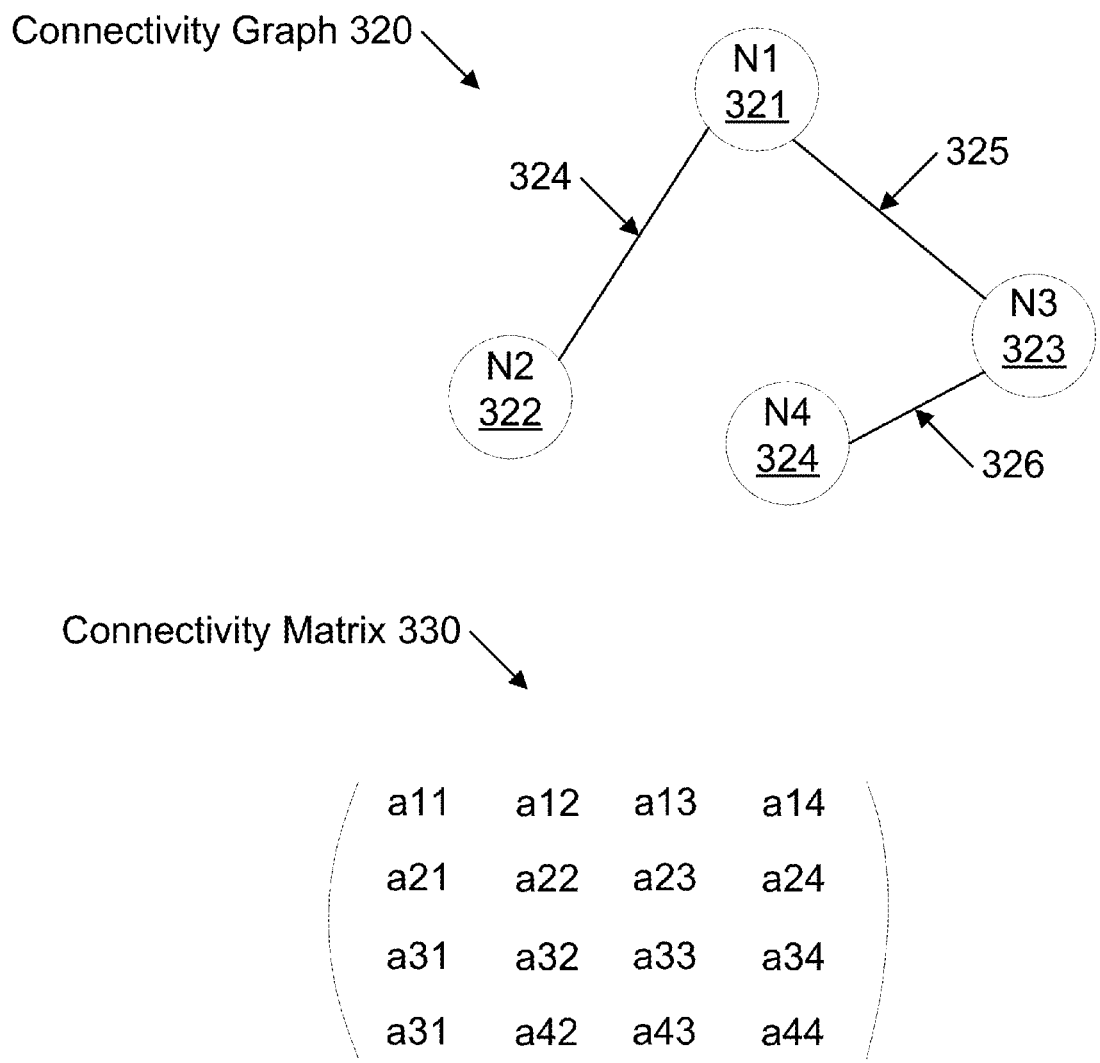

Generally speaking, the connectivity among a pair of IP addresses observed in the incoming flows (401) represents whether the pair of IP addresses communicate with each other or not. For example, connectivity exists (or connectivity=1) between a source IP address $IP_i$ and a destination IP address $IP_j$ in a flow observed in the incoming flows (401). If two IP addresses $IP_m$ and $IP_n$, each observed in separate flows of the incoming flows (401) but never observed together in any of the incoming flows (401), then the connectivity does not exist (or connectivity=0) for these two IP addresses $IP_m$ and $IP_n$. FIG. 3C shows a connectivity graph (320) representing the connectivity among four IP addresses $IP_1$ through $IP_4$ observed in the incoming flows (401). The IP addresses $IP_1$ through $IP_4$ are represented by four nodes $N_1$ (321), $N_2$ (322), $N_3$ (323), and $N_4$ (324). Edges (324), (325), and (326) correspond to one or more flow associated with IP address pairs $(IP_1, IP_2)$, $(IP_1, IP_3)$, and $(IP_3, IP_4)$, respectively in the incoming flows (401). Lack of the edge between node $N_2$ (322) and $N_4$ (324) indicates that no flow associated with IP address pair $(IP_2, IP_4)$ exist in the incoming flows (401). The graph (320) may be represented as connectivity matrix (330) where each of the element $a_{ij}$ of the connectivity matrix (330) represents connectivity of the IP address pair $(IP_i, IP_j)$. For example, $a_{24}=0$ due to lack of connectivity between nodes $N_2$ (322) and $N_4$ (324). In some examples, the connectivity and edges in the connectivity graph (320) may be weighted by the number of flows associated with the corresponding IP address pairs that exist in the incoming flows (401). Accordingly, the value of the element $a_{ij}$ of the connectivity matrix (330) represents the number of flows. In other examples, the connectivity and edges in the connectivity graph (320) may be weighted by other attributes associated with the corresponding IP address pairs that exist in the incoming flows (401).

Returning to FIG. 3B, the connectivity matrix a (411) may be stored in memory in sparse format in order to keep memory usage lower. The connectivity matrix a (411) is updated in a streaming fashion as new flows enter the system within the current time window and before they are classified.

Network data captured from high capacity links impose a challenge to the BotWatch system (300). Specifically, the number of unique IP addresses to keep track of can easily exceed hundreds of thousands, and hence the memory footprint may grow unbounded as the system sees more IP-addresses. The second challenge is how to avoid bias against new IP-pairs which would assume smaller values for number of contacts compared to those pairs that have been seen for long periods of time. A weighted exponential moving average formula is used to generate the weighted connectivity matrix A (412) from the connectivity matrix a (411). For each of consecutive time intervals of duration T, all values in matrix A (412) are scaled down as follows:

$$A^t_{i,j} = (1-\alpha)A^{t-1}_{i,j} + \alpha a^{t-1}_{i,j}$$

where $a^{t-1}_{i,j}$ indicates the matrix element of $a^{t-1}$ at row i and column j within the time interval t−1, $A^{t-1}_{i,j}$ indicates the matrix element of $A^{t-1}$ at row i and column j within the time interval t−1 $A^t_{i,j}$ indicates the matrix element of $A^t$ at row i and column j within the time interval t.

Note that the coefficient α is between 0 and 1 and represents the rate of how influences of older observations on matrix elements are discounted (higher values implies faster decay). Alternatively, α can be expressed in terms of N time periods of length T, where α=2/(N+1). For example, N=19 is equivalent to α=0.1. The statistical half-life of the weights (the interval over which the weights decrease by a factor of two) is approximately N/2.8854, which is within 1% if N>5.

Further, to prevent unbounded memory usage, any value below a threshold τ is removed. The values of α and τ are based on (1) the desired memory usage of the system and (2) the maximum amount of time at which the relevant botnet behaviors are expected to occur. In other words, if a bot is not expected to check in with a C&C more than once in ten days, then values in A (412) can be timed out and removed after ten days.

As the nature and behavior of botnets change over time, and new botnets emerge, the BotWatch system (300) relearns the classification model (306) each time interval T in a sequence of time intervals. This training is done in an offline fashion, for example, in a separate server so as not to diminish online classification performance. As shown in FIG. 4, a snapshot of the connectivity matrix a (411) (e.g., $a^{t-1}$, $a^t$, etc.) and the list of known bots L (e.g., $L^{t-1}$, $L^t$, etc.) are provided into the supervised learning (404) at the beginning of each time interval T. The computation of the classification model (306) requires time interval ε, where T is chosen so that T>>ε. For example, ε may be one second, one minute, etc. and T may be one day, one week, etc. The time interval ε may also include the computation time to extract matrices a (411), A (412) and features f (413) from the incoming flows (401). Within each time interval (e.g., time interval t, time interval t+1, etc.) at a time point delayed from the beginning of the time interval by ε, the newly computed classification model (e.g., $M^t$, $M^{t+1}$, etc.) is provided to be used in online classification (405), replacing the previous classification model computed in the previous time interval. For example, $M^{t-1}$ is computed during T and T+ε and used during T+ε and 2T+ε before being replaced by $M^t$, which is computed during 2T and 2T+ε and used during 2T+ε and 3T+ε before being replaced by yet another newly computed classification model. Said in other words, the online classification (405) uses (i) the currently active classification model (e.g., computed at the beginning of each time interval (e.g., time interval t) by the offline supervised learning (404) based on historical network data collected during an immediately prior time interval (e.g., time interval t−1) and weighted based on the EWMA formula and (ii) the features (of the real-time network data also weighted based on the EWMA formula) extracted by the feature extractor (402) to label IP addresses observed in the incoming flows (401) during the time interval t shifted by ε. In the example shown in FIG. 3B when the current time is within the time interval t, the historical network data is collected within the one time interval t−1 then weighted based on the EWMA formula while the real-time network data is collected within the immediate subsequent time interval t then weighted based on the EWMA formula. As time moves on along the flow (406) when the current time is now within the time interval t+1, the historical network data is collected within the one time interval t then weighted based on the EWMA formula while the real-time network data is collected within the immediate subsequent time interval t+1 then weighted based on the EWMA formula. Generally, the historical network data and the real-time network data are weighted using same value of α. However, different values of α may also be used when weighting the historical network data and the real-time network data.

Initially during online classification (405), an unknown IP address is quick-matched against the blacklist of known bots. If no match is found, the learned classification model is used to classify the unknown IP address. Note that IP addresses instead of individual flows are classified.

As noted above the features f (413) may include outdegree, PageRank, bot neighbor count, etc. For a node in the connectivity graph (e.g., connectivity graph (320)), the number of other nodes that act as senders linking (i.e., sending data packets to form a flow) to the node is called the indegree of the node. Similarly, the number of nodes that act as receivers to whom the node links to is the outdegree of the node. Generally, bots usually have high outdegrees because they have to connect to their C&Cs to obtain orders and connect to innocent machines to complete their tasks. Accordingly, the outdegree of nodes in the connectivity graph (320) may be used in heuristics to identify bots during the supervised learning (404) and online classification (405). For example, the outdegree of nodes in the connectivity graph (320) may be computed based on the connectivity matrix a (411) or the weighted connectivity matrix A (412).

In some examples, the outdegree may be weighted by the number of connections. Instead of counting the number of outgoing links (i.e., flows sent by the node), the number of outgoing HTTP connections from each client IP is counted as a weighted outdegree, in which each outgoing link is weighted by the number of connections established between the pair of IP addresses.

As noted above, there are blacklists publicly available that provides what server domains or IPs are malicious. Another heuristics to identify bots during the supervised learning (404) and online classification (405) may be based on the supposition that if a client IP visits many of such blacklist members, it is likely that the client IP is a bot or will soon be infected. Accordingly, a feature "outdegree to bad servers" is defined that counts the number of outgoing links from each IP address observed in the incoming flows (401) to known bad servers. A variation of the outdegree to bad servers may also be defined that counts the total number of HTTP connections made to known bad servers.

The term PageRank™ (a registered trade mark of Google, Inc., Mountain View, Calif.) relates to a link analysis algorithm, named after Larry Page and used by the Google™ (a registered trade mark of Google, Inc., Mountain View, Calif.) Internet search engine that assigns a numerical weighting to each element of a hyperlinked set of documents, such as the World Wide Web, with the purpose of "measuring" its relative importance within the set. PageRank™ is a probability distribution representing the likelihood that a person randomly clicking on links will arrive at any particular page (e.g., the page represented as E). PageRank™ can be calculated for collections of documents of any size. It is assumed in several research papers that the distribution is evenly divided among all documents in the collection at the beginning of the computational process. The PageRank™ computations require several passes (i.e., iterations) through the collection to adjust approximate PageRank™ values to more closely reflect the theoretical true value. A probability is expressed as a numeric value between 0 and 1. A 0.5 probability is commonly expressed as a "50% chance" of something happening. Hence, a PageRank™ of 0.5 means there is a 50% chance that a person clicking on a random link will be directed to the document with PageRank™=0.5.

The PageRank™ algorithm may be applied to any collection of entities (or elements) with reciprocal quotations and references. Throughout this disclosure, the numerical weight that it assigns to any given element E in such set is referred to as the page rank of E and denoted by PR(E). When applying the PageRank™ algorithm to generate the features f (413), the page rank of an IP address (represented as a node $p_i$ in the connectivity graph) observed in the incoming flows (401) is computed using the equation below.

$$PR(p_i) = \frac{1-d}{N} + d \sum_{p_j \in M(p_i)} \frac{PR(p_j)}{L(p_j)}$$

where $PR(p_i)$ is the page rank of $p_i$, $L(p_j)$ is the number of outbound links on $p_j$ (i.e., outdegree of $p_j$), N is the total number of nodes in the network, d is a pre-determined parameter, and $M(p_i)$ is a set of nodes with connectivity to $p_i$. As the network evolves due to new clients visiting new Websites resulting in new links (or edges) being established among the existing nodes in the connectivity graph, page rank may be computed incrementally based on the existing results.

The feature "N-hop Bot-Neighbors" is computed as the number of bots among each IP address's n-hop neighborhood in the connectivity graph (e.g., connectivity graph (320)). An IP address's n-hop neighborhood is formally defined as S (u, n)={v|a path exists in the connectivity graph that is of length less than or equal to n between u and v}. As is known to those skilled in the art, the symbol | represents the term "given". To compute this feature, a matrix is constructed that contains IP addresses (denoted as i or j) observed in the incoming flows (401), denoted as A'. $A'_{i,j}=1$ if there is a HTTP connection between i and j and $A'_{i,j}=0$ if otherwise. Accordingly, the N-hop Bot-neighbors for the i-th client IP address is computed as the number of non-zero elements in $A'^n$.

Since A' is usually very sparse, it is not that expensive to compute $A'^n$ for a small n. However, when n becomes larger, the matrix A' becomes denser and the matrix multiplication becomes very costly. As new network traffics are observed, the matrix A' expands and $A'^n$ needs to be re-computed accordingly. Since the computation is expensive, incremental approximation of matrix multiplication may be used.

For IP addresses observed in the incoming flows (401) that are associated with server domains, their Google™ PageRank™ (computed and provided by Google™) based on the World Wide Web may be used in the heuristics to identify bots during the supervised learning (404) and online classification (405). The Google™ PageRank™ score ranges from 0 to 10, while higher value implies that a Website is more important. Although not always true, the Google™ PageRank™ of a Website to some extent reflects its authority and trustworthiness. For instance, a Website with Google™ PageRank™ higher than 7 is very likely to be trustworthy, and a Google™ PageRank™ lower than 4 implies that the Website is either not well-established or not trustworthy. A heuristics is based on identifying whether a client IP is a bot by evaluating the Google™ PageRank™ distribution of the Websites the client visits. If a client visits many Websites with low scores, it is considered more likely that the client is a bot. For example, four features are defined as g(u,i), i=1, 2, 3, 4, where g(u,i) is the number of Websites the client u visits that has a Google™ PageRank™ i.

As noted above, the supervised learning (404) is performed using the machine learning based model generator (125) based on machine learning algorithms such as Bayesian network, Multi-layer perceptron, Decision tree, Alternating Decision Tree, and Naives Bayes Tree, etc. The classification model (306) generated by the machine learning based model generator (125) during supervised learning (404) may be represented as a function Y=F(X) where X represents a feature value of a flow tuple based on incoming flows (401) and Y represents a predicted label of malicious or non-malicious. In one or more embodiments, the classification model (306) is $M^t$ computed at the beginning of time interval t based on (i) a label "malicious" for a data unit (e.g., flow tuple) associated with a known botnet where the data unit (or an IP address of the data unit) is found in both the external IP blacklist $L^{t-1}$ (e.g., containing an IP address of the flow tuple) and the historical network data collected in time interval t−1 and (ii) a feature X (that describes that data unit) as calculated based on the historical network data collected in time interval t−1. As noted above, the historical network data collected in time interval t−1 my be weighted based on the EWMA formula for calculating the feature X. Based on the machine learning algorithm, the function F(X) is adjusted such that the predicted label Y matches, within a statistical range, the known label "malicious" for all data units of the historical network data that are also found in the external IP blacklist. For example, the function F(X) may be in a linear form, such as $F(X)=a*x_1+b*x_2+c*x_3$ wherein X contains 3 metrics $x_1$, $x_2$, and $x_3$. Based on the machine learning algorithm, the coefficients a, b, and C are adjusted such that $a*x_1+b*x_2+c*x_3$ matches, within a statistical range, the label "malicious" for all data units of the historical network data that are also found in the external IP blacklist.

In one or more embodiments, the machine learning algorithm uses a Bayesian network. Given a set of variables $U=\{x_1 \ldots x_k\}$ representing the metrics $x_1 \ldots x_k$ used in defining the feature X, the Bayesian network for the machine learning based model generator (125) is a network structure that consists of a directed acyclic graph (DAG) over U and a set of associated probability tables. By applying the machine learning algorithm using the Bayesian network, the function F(X) is adjusted such that Y matches, within a statistical range, the label "malicious" for all data units of the historical network data that are also found in the external IP blacklist.

In one or more embodiments, the machine learning algorithm uses a multilayer perceptron (MLP), which is an artificial neural network consisting of multiple layers of nodes in a directed graph, fully connected from one layer to the next. Except for the input nodes, each node in the MLP is a neuron (i.e., processing element) with a nonlinear activation function. MLP utilizes a supervised learning technique called backpropagation for training the network, and maps sets of input data onto a set of appropriate output. MLP is a modification of standard linear perceptron, which can separate data that is not linearly separable. By applying the machine learning algorithm using the MLP, the function F(X) is adjusted such that Y matches, within a statistical range, the label "malicious" for all data units of the historical network data that are also found in the external IP blacklist.

In one or more embodiments, the machine learning algorithm uses a Decision Tree, which is a collection of classifier. During the training process a decision tree is built with its internal nodes correspond to different attributes (e.g., feature metrics) of the data samples (e.g., data units in the network trace). Each of such internal nodes split the training samples according to the value of that attribute. Ideally at each leaf node there should contain only data samples from a single class. Then given a new data sample, its attributes will be checked against starting from the root of the tree, until it arrives to one of the leaf node, where its class will be determined. For example, J48 is a decision tree learning algorithm known to those skilled in the art. An Alternating Decision Tree (ADTree) is a generalization of Decision Tree and has connections to boosting algorithms of machine learning. By applying the machine learning algorithm using the Decision Tree or Alternating Decision Tree, the function F(X) is adjusted such that Y matches, within a statistical range, the label "malicious" for all data units of the historical network data that are also found in the external IP blacklist.

In one or more embodiments, the machine learning algorithm uses a Naive Bayes Tree, which is a hybrid of decision-tree classifiers and Naive-Bayes classifiers. In particular, the decision-tree nodes contain univariate splits as regular decision-trees, but the leaves contain Naive-Bayesian classifiers. By applying the machine learning algorithm using the Naive Bayes Tree, the function F(X) is adjusted such that Y matches, within a statistical range, the label "malicious" for all data units of the historical network data that are also found in the external IP blacklist.

FIG. 4A-4C shows statistics in an example data set of 24 hours worth of network data. FIG. 4A shows that between 6 k-7 k unique client IP-addresses are observed in incoming flows (401). FIG. 4B shows that the 42%-46% of client IP-addresses are bots in an example external blacklist (403) (i.e., ground truth data set). FIG. 4C shows that there is a high degree of commonality (approximately 75% in common) of clients observed across two consecutive hourly windows. In contrast, there is less commonality exhibited for servers, with about 60% of server IP-addresses in common.

In the example, the first 12 hours (designated as offline training period) of the example data set is used as historical network data to generate the classification model while the second 12 hours (designated as the online detecting period) of example data set is used as real-time network data for analysis. The known bots in the example data set during the first 12 hours of training period is used as the ground truth data set. The classification models are then built (learned) using aforementioned features and heuristics based on the designated historical network data from the first 12 hours and applied to the test data from the second 12 hours. FIG. 4D shows the results in terms of F-measure defined as a geometric mean of Recall and Precision as follows:

$$F=(2*Recall*Precision)/(Recall+Precision)$$

where Precision=number of accurate bot detection/total number of bots detected while Recall=number of accurate bot detection/actual number of bots.

As can be seen in FIG. 4D, all machine learning algorithms achieve a much higher F-measure compared to random guess. In particular, J48 performs the best achieving almost 40% F-measure and the highest Recall.

Although specific formats, structures, or partitions are used as examples in the foregoing description regarding the various components in the malicious domain name detecting tool, user system, and computer network, one skilled in the art, with the benefit of this disclosure, will recognize that other formats or structures may also be used in the system, methods, and examples described without deviating from the spirit of the invention. For example, the format of a matrix may be transposed such that rows become columns and vice versa. Although the EWMA is used as the pre-determined statistical formula in the examples described above, other time series forecasting method may also be used, such as moving average, auto regressive model, etc.

Figure 5:
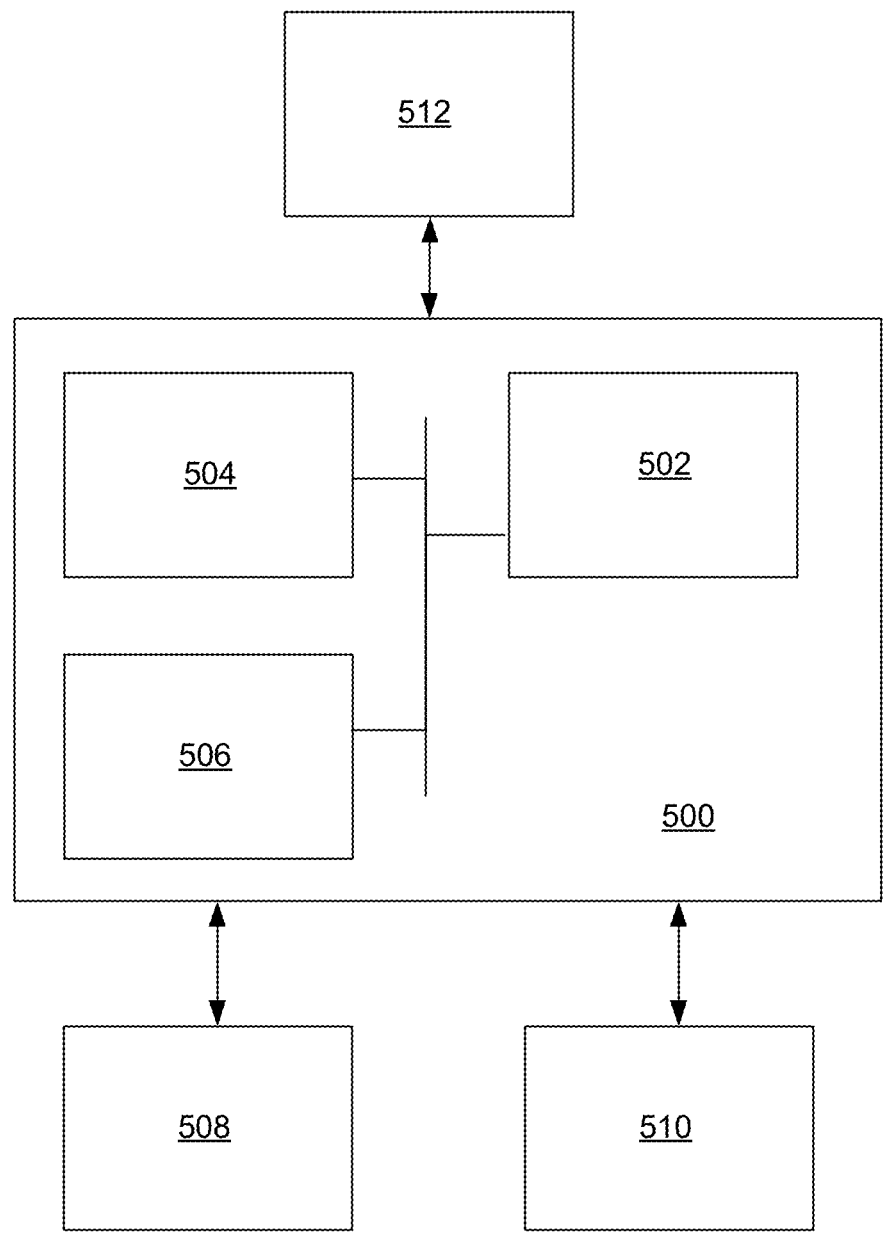
FIG. 5 shows a computer system according to aspects of the invention.

Embodiments of the invention may be implemented on virtually any type of computer regardless of the platform being used. For example, as shown in FIG. 5, a computer system (500) includes one or more processor(s) (502) (e.g., central processing unit or CPU), associated memory (504) (e.g., random document access memory (RAM), cache memory, flash memory, etc.), a storage device (506) (e.g., a hard disk, an optical drive such as a compact disk drive or digital video disk (DVD) drive, a flash memory stick, etc.), and numerous other elements and functionalities typical of today's computers (not shown). The computer (500) may also include input means, such as a keyboard (508), a mouse (510), or a microphone (not shown). Further, the computer (500) may include output means, such as a monitor (512) (e.g., a liquid crystal display (LCD), a plasma display, or cathode ray tube (CRT) monitor) for example to display various results such as the feature vectors, the principal components, the application space, the signatures, etc. The computer system (500) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (500) includes at least the minimal processing, input, and/or output means necessary to practice embodiments of the invention.

Further, those skilled in the art will appreciate that one or more elements of the aforementioned computer system (500) may be located at a remote location and connected to the other elements over a network. Further, embodiments of the invention may be implemented on a distributed system having a plurality of nodes, where each portion of the invention (e.g., various modules of FIG. 1) may be located on a different node within the distributed system. In one embodiments of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for identifying a botnet in a network, comprising:

obtaining historical network data in the network, the historical network data comprising a first plurality of data units;

analyzing, by a central processing unit (CPU) of a computer and using a pre-determined heuristic, the historical network data to determine a plurality of values of a connectivity graph based feature for the first plurality of data units, wherein a first value of the connectivity graph based feature for a first data unit of the first plurality of data units is determined based on and representing connectivity characteristics of at least a portion of the historical network data associated with the first data unit;

obtaining a ground truth data set associated with the historical network data, the ground truth data set comprising a plurality of labels with each label assigned to a corresponding data unit of the first plurality of data units, said each label comprising one of a first label categorizing said corresponding data unit as associated with the botnet and a second label categorizing said corresponding data unit as not associated with the botnet;

analyzing, by the CPU and using a machine learning algorithm, the historical network data and the ground truth data set to generate a model comprising statistical predictions of the plurality of labels as a function of the plurality of values of the connectivity graph based feature with respect to the first plurality of data units;

obtaining real-time network data in the network, the real-time network data comprising a second plurality of data units;

analyzing, by the CPU and using the pre-determined heuristic, the real-time network data to determine a second value of the connectivity graph based feature for a second data unit of the second plurality of data units, wherein the second value is determined based on and representing connectivity characteristics of at least a portion of the real-time network data associated with the second data unit;

assigning a third label to the second data unit by applying the model to the second value of the connectivity graph based feature; and categorizing the second data unit as associated with the botnet based on the third label, wherein the first plurality of data units comprise a plurality of IP (Internet Protocol) addresses, wherein analyzing the historical network data using the pre-determined heuristic comprises:

constructing a graph comprising nodes representing the plurality of IP addresses and edges each representing communication within the historical network data between two of the plurality of IP addresses;

analyzing the graph to determine at least a portion of the plurality of values of the connectivity graph based feature corresponding to the plurality of IP addresses;

identifying botnet nodes among the nodes according to the ground truth data set; and determining an anti-trust rank that is calculated using a page rank algorithm and at least one edge weight assigned to at least one of the edges, wherein the at least one edge weight is determined based on whether the at least one of the edges is related to any of the botnet nodes, and wherein the connectivity graph based feature represents connectivity characteristics associated with the nodes and comprises the anti-trust rank.

2. The method of claim 1, wherein the graph is time dependent and comprises a first graph corresponding to a first version of the historical network data within a first time window and a second graph corresponding to a second version of the historical network data within a second time window, wherein analyzing the graph comprises:

representing the first and second graphs as first and second matrices; and generating a time averaged matrix from the first and second matrices based on a pre-determined statistical formula, wherein said at least a portion of the plurality of values of the connectivity graph based feature are determined for the plurality of IP addresses based on the time averaged matrix.

3. The method of claim 2, wherein the pre-determined statistical formula comprises at least one selected from a group consisting of moving average, auto regressive model, and exponentially weighted moving average (EWMA).

4. The method of claim 1, wherein the first plurality of data units comprise a plurality of client IP (Internet Protocol) addresses and a plurality of domain names, and wherein analyzing the historical network data using the pre-determined heuristic comprises:

constructing a graph comprising client nodes representing the plurality of IP addresses, server nodes representing the plurality of domain names, and edges each representing communication within the historical network data between a client node and a server node; and analyzing the graph to determine at least a portion of the plurality of values of the connectivity graph based feature corresponding to the first plurality of data units.

5. The method of claim 1, wherein the machine learning algorithm comprises at least one selected from a group consisting of Bayesian network, Multi-layer perceptron, Decision tree, Alternating Decision Tree, and Naives Bayes Tree.

6. A system for identifying a botnet in a network, comprising:

a processor; and memory storing instructions, when executed by the processor, comprising functionalities for:

obtaining historical network data in the network, the historical network data comprising a first plurality of data units;

analyzing, using a pre-determined heuristic, the historical network data to determine a plurality of values of a connectivity graph based feature for the first plurality of data units, wherein a first value of the connectivity graph based feature for a first data unit of the first plurality of data units is determined based on and representing connectivity characteristics of at least a portion of the historical network data associated with the first data unit;

obtaining a ground truth data set associated with the historical network data, the ground truth data set comprising a plurality of labels with each label assigned to a corresponding data unit of the first plurality of data units, said each label comprising one of a first label categorizing said corresponding data unit as associated with the botnet and a second label categorizing said corresponding data unit as being not associated with the botnet;

analyzing, using a machine learning algorithm, the historical network data and the ground truth data set to generate a model comprising statistical predictions of the plurality of labels as a function of the plurality of values of the connectivity graph based feature with respect to the first plurality of data units;

obtaining real-time network data in the network, the real-time network data comprising a second plurality of data units;

analyzing, using the pre-determined heuristic, the real-time network data to determine a second value of the connectivity graph based feature for a second data unit of the second plurality of data units, wherein the second value is determined based on and representing connectivity characteristics of at least a portion of the real-time network data associated with the second data unit;

assigning a third label to the second data unit by applying the model to the second value of the connectivity graph based feature; and categorizing the second data unit as associated with the botnet based on the third label, wherein the first plurality of data units comprise a plurality of IP (Internet Protocol) addresses, wherein analyzing the historical network data using the pre-determined heuristic comprises:

constructing a graph comprising nodes representing the plurality of IP addresses and edges each representing communication within the historical network data between two of the plurality of IP addresses;

analyzing the graph to determine at least a portion of the plurality of values of the connectivity graph based feature corresponding to the plurality of IP addresses;

identifying botnet nodes among the nodes according to the ground truth data set; and determining an anti-trust rank that is calculated using a page rank algorithm and at least one edge weight assigned to at least one of the edges, wherein the at least one edge weight is determined based on whether the at least one of the edges is related to any of the botnet nodes, and wherein the connectivity graph based feature represents connectivity characteristics associated with the nodes and comprises the anti-trust rank.

7. The system of claim 6, wherein the graph is time dependent and comprises a first graph corresponding to a first version of the historical network data within a first time window and a second graph corresponding to a second version of the historical network data within a second time window, wherein analyzing the graph comprises:

representing the first and second graphs as first and second matrices; and generating a time averaged matrix from the first and second matrices based on a pre-determined statistical formula, wherein said at least a portion of the plurality of values of the connectivity graph based feature are determined for the plurality of IP addresses based on the time averaged matrix.

8. The system of claim 7, wherein the pre-determined statistical formula comprises at least one selected from a group consisting of moving average, auto regressive model, and exponentially weighted moving average (EWMA).

9. The system of claim 6, wherein the first plurality of data units comprise a plurality of client IP (Internet Protocol) addresses and a plurality of domain names, and wherein analyzing the historical network data using the pre-determined heuristic comprises:

constructing a graph comprising client nodes representing the plurality of IP addresses, server nodes representing the plurality of domain names, and edges each representing communication within the historical network data between a client node and a server node; and analyzing the graph to determine at least a portion of the plurality of values of the connectivity graph based feature corresponding to the first plurality of data units.

10. The system of claim 6, wherein the machine learning algorithm comprises at least one selected from a group consisting of Bayesian network, Multi-layer perceptron, Decision tree, Alternating Decision Tree, and Naives Bayes Tree.

11. A non-transitory computer readable medium storing instructions for identifying a botnet in a network, the instructions, when executed by a processor of a computer, comprising functionality for:

obtaining historical network data in the network, the historical network data comprising a first plurality of data units;

analyzing, using a pre-determined heuristic, the historical network data to determine a plurality of values of a connectivity graph based feature for the first plurality of data units, wherein a first value of the connectivity graph based feature for a first data unit of the first plurality of data units is determined based on and representing connectivity characteristics of at least a portion of the historical network data associated with the first data unit;

obtaining a ground truth data set associated with the historical network data, the ground truth data set comprising a plurality of labels with each label assigned to a corresponding data unit of the first plurality of data units, said each label comprising one of a first label categorizing said corresponding data unit as associated with the botnet and a second label categorizing said corresponding data unit as being not associated with the botnet;

analyzing, using a machine learning algorithm, the historical network data and the ground truth data set to generate a model comprising statistical predictions of the plurality of labels as a function of the plurality of values of the connectivity graph based feature with respect to the first plurality of data units;

obtaining real-time network data in the network, the real-time network data comprising a second plurality of data units;

analyzing, using the pre-determined heuristic, the real-time network data to determine a second value of the connectivity graph based feature for a second data unit of the second plurality of data units, wherein the second value is determined based on and representing connectivity characteristics of at least a portion of the real-time network data associated with the second data unit;

assigning a third label to the second data unit by applying the model to the second value of the connectivity graph based feature; and categorizing the second data unit as associated with the botnet based on the third label, wherein the first plurality of data units comprise a plurality of IP (Internet Protocol) addresses, wherein analyzing the historical network data using the pre-determined heuristic comprises:

constructing a graph comprising nodes representing the plurality of IP addresses and edges each representing communication within the historical network data between two of the plurality of IP addresses;

analyzing the graph to determine at least a portion of the plurality of values of the connectivity graph based feature corresponding to the plurality of IP addresses;

identifying botnet nodes among the nodes according to the ground truth data set; and determining an anti-trust rank that is calculated using a page rank algorithm and at least one edge weight assigned to at least one of the edges, wherein the at least one edge weight is determined based on whether the at least one of the edges is related to any of the botnet nodes, and wherein the connectivity graph based feature represents connectivity characteristics associated with the nodes and comprises the anti-trust rank.

12. The non-transitory computer readable medium of claim 11, wherein the graph is time dependent and comprises a first graph corresponding to a first version of the historical network data within a first time window and a second graph corresponding to a second version of the historical network data within a second time window, wherein analyzing the graph comprises:

representing the first and second graphs as first and second matrices; and generating a time averaged matrix from the first and second matrices based on a pre-determined statistical formula,
wherein said at least a portion of the plurality of values of the connectivity graph based feature are determined for the plurality of IP addresses based on the time averaged matrix.

13. The non-transitory computer readable medium of claim 12, wherein the pre-determined statistical formula comprises at least one selected from a group consisting of moving average, auto regressive model, and exponentially weighted moving average (EWMA).

14. The non-transitory computer readable medium of claim 11,
wherein the first plurality of data units comprise a plurality of client IP (Internet Protocol) addresses and a plurality of domain names, and
wherein analyzing the historical network data using the pre-determined heuristic comprises:
constructing a graph comprising client nodes representing the plurality of IP addresses, server nodes representing the plurality of domain names, and edges each representing communication within the historical network data between a client node and a server node; and
analyzing the graph to determine at least a portion of the plurality of values of the connectivity graph based feature corresponding to the first plurality of data units.

15. The non-transitory computer readable medium of claim 11, wherein the machine learning algorithm comprises at least one selected from a group consisting of Bayesian network, Multi-layer perceptron, Decision tree, Alternating Decision Tree, and Naives Bayes Tree.

* * * * *